(12) United States Patent
Broder et al.

(10) Patent No.: US 8,447,764 B2
(45) Date of Patent: May 21, 2013

(54) INDEXING AND SEARCHING OF ELECTRONIC MESSAGE TRANSMISSION THREAD SETS

(75) Inventors: Andrei Z Broder, Haifa (IL); Nadav Eiron, Haifa (IL); Marcus Fontoura, Haifa (IL); Michael Herscovici, Haifa (IL); Ronny Lempel, Haifa (IL); John McPherson, Jr., Haifa (IL); Eugene Shekita, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/494,044

(22) Filed: Jun. 12, 2012

(65) Prior Publication Data

US 2012/0259834 A1 Oct. 11, 2012

Related U.S. Application Data

(60) Division of application No. 12/484,213, filed on Jun. 14, 2009, which is a continuation of application No. 11/200,969, filed on Aug. 10, 2005, now Pat. No. 7,565,347.

(51) Int. Cl.
*G06F 7/00* (2006.01)
*G06F 17/30* (2006.01)

(52) U.S. Cl.
USPC .......................................................... 707/741

(58) Field of Classification Search
USPC ........................................... 707/741, 999.102
See application file for complete search history.

(56) References Cited

U.S. PATENT DOCUMENTS

| | | | |
|---|---|---|---|
| 4,496,173 A | 1/1985 | Roche et al. | |
| 6,167,402 A | 12/2000 | Yeager | |
| 6,789,083 B2 | 9/2004 | Thelen | |
| 7,062,772 B2 | 6/2006 | Underseth et al. | |
| 7,383,274 B2 | 6/2008 | Pearce et al. | |
| 8,131,726 B2 | 3/2012 | Broder et al. | |
| 2002/0107877 A1 | 8/2002 | Whiting et al. | |
| 2002/0199096 A1 | 12/2002 | Wenocur et al. | |
| 2003/0135495 A1* | 7/2003 | Vagnozzi | 707/3 |
| 2004/0044735 A1* | 3/2004 | Hoblit | 709/206 |
| 2005/0240558 A1 | 10/2005 | Gil et al. | |
| 2006/0212457 A1 | 9/2006 | Pearce et al. | |

* cited by examiner

*Primary Examiner* — Aleksandr Kerzhner

(57) ABSTRACT

A method is carried out by storing information describing configurations of discussion threads formed of respective series of EMTs that are exchanged among at least two individuals. The discussion threads have a root EMT, zero or more reply EMTs, and a last offspring EMT. The method is further carried out by compacting the EMT discussion threads, and indexing the compacted EMT discussion threads.

4 Claims, 29 Drawing Sheets

FIG.3

M11:
FROM: CALITOURS
FROM-EMAIL: <CALITOURS@EMAIL.COM>
TO: "BONNIE TEMPLE"
TO-EMAIL: <BTEMPLE@EMAIL.COM>
DATE: <WED-6-OCT-2004-19:06:49-0300>
SUBJECT: BUS SCHEDULE BETWEEN SAN FRANCISCO AND MONTEREY

11 / 21:
BONNIE,
WE HAVE A REGULAR BUS BETWEEN SAN FRANCISCO AND MONTEREY
DEPART 07:30Hs OR 18:00Hs   RETURN 06:00Hs OR 17:00Hs
THE TICKET COSTS $45 (ONE WAY)
BEST REGARDS
NELLY

CALITOURS INC. 2367 LIBERTY STREET, MONTEREY
TEL: (654)491-3682 FAX: (654)491-2178
WWW.CALITOURSFORFUN

20:
>------ORIGINAL MESSAGE------
> FROM: "BONNIE TEMPLE"   <BTEMPLE@EMAIL.COM>
> TO: <CALITOURS@EMAIL.COM>
> SENT: <WEDNESDAY-OCTOBER-06-2004-5:29-PM>
> SUBJECT: BUS SCHEDULE BETWEEN SAN FRANCISCO AND MONTEREY
>
>HI,
>I'M PLANNING A TRIP TO CALIFORNIA IN DECEMBER 2004.
>CAN YOU PLEASE SEND ME INFORMATION ON THE BUS SCHEDULE
>BETWEEN SAN FRANCISCO AND MONTEREY?
>THANK YOU!
>BONNIE TEMPLE

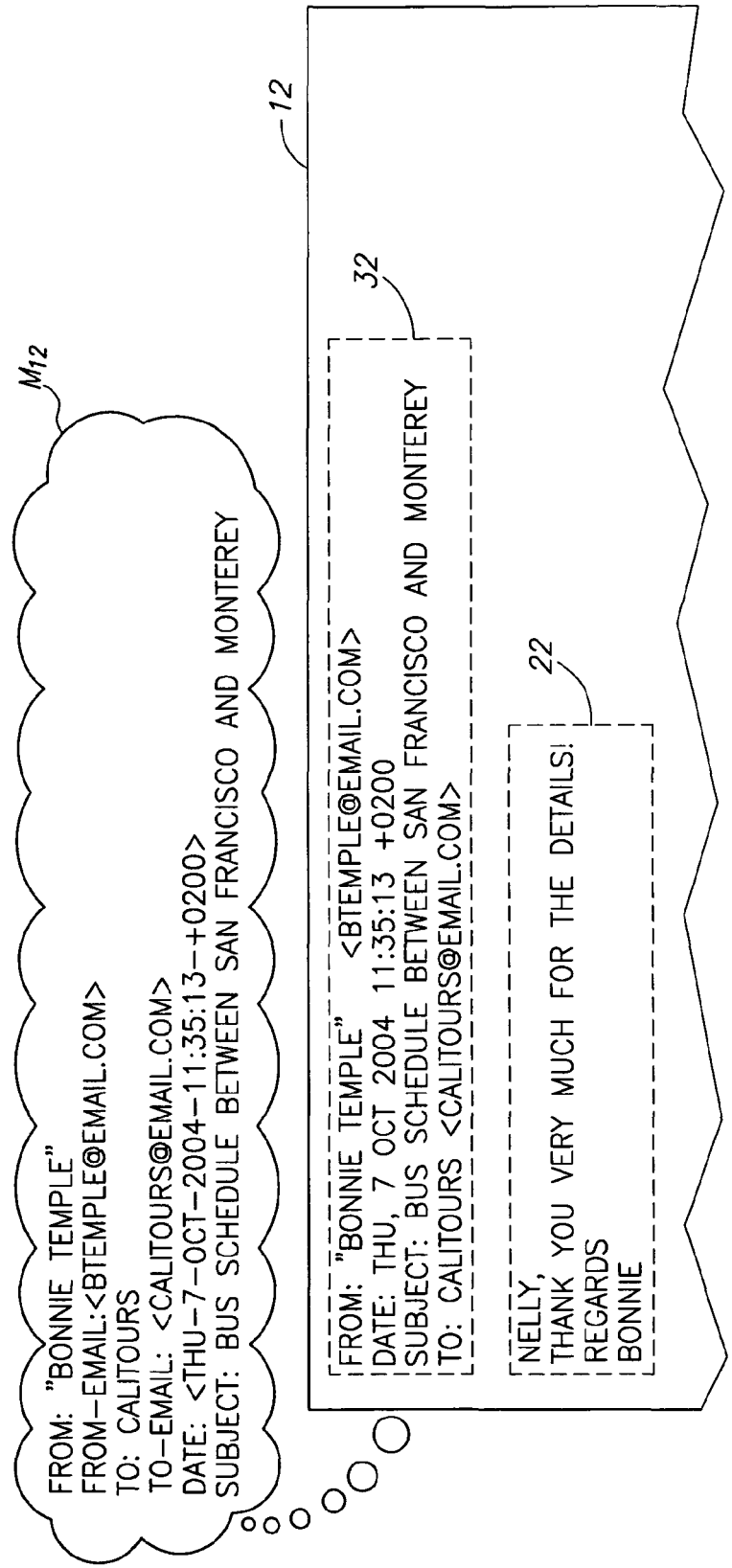

ON WEDNESDAY 6 OCT 2004 19:06:40 -0300, CALITOURS <CALITOURS@EMAIL.COM> WROTE:
> BONNIE,
> WE HAVE A REGULAR BUS BETWEEN SAN FRANCISCO AND MONTEREY
> DEPART 07:30Hs OR 18:00Hs    RETURN 06:00Hs OR 17:00Hs
> THE TICKET COSTS $45 (ONE WAY)
> BEST REGARDS
> NELLY
> CALITOURS INC. 2367 LIBERTY STREET, MONTEREY
> TEL: (654)491-3682 FAX: (654)491-2178
> WWW.CALITOURSFORFUN                                            ⎯ 21

>  --------ORIGINAL MESSAGE--------
>> FROM: "BONNIE TEMPLE"    <BTEMPLE@EMAIL.COM>
>> TO: <CALITOURS@EMAIL.COM>
>> SENT: <WEDNESDAY-OCTOBER-06-2004-5:29-PM>
>> SUBJECT: BUS SCHEDULE BETWEEN SAN FRANCISCO AND MONTEREY
>>
>> HI,
>> I'M PLANNING A TRIP TO CALIFORNIA IN DECEMBER 2004.
>> CAN YOU PLEASE SEND ME INFORMATION ON THE BUS SCHEDULE
>> BETWEEN SAN FRANCISCO AND MONTEREY?
>> THANK YOU!
>> BONNIE TEMPLE                                                 ⎯ 20

FIG.4B

| docID | META-DATA ($M_{docID}$) |
|---|---|
| 10 | FROM: "BONNIE TEMPLE"<br>FROM-EMAIL: <BTEMPLE@EMAIL.COM><br>TO-EMAIL: <CALITOURS@EMAIL.COM><br>DATE: <WEDNESDAY-OCTOBER-06-2004-5:29-PM><br>SUBJECT: BUS SCHEDULE BETWEEN SAN FRANCISCO AND MONTEREY — $M_{10}$ |
| 11 | FROM: CALITOURS<br>FROM-EMAIL: <CALITOURS@EMAIL.COM><br>TO: "BONNIE TEMPLE"<br>TO-EMAIL: <BTEMPLE@EMAIL.COM><br>DATE: <WED-6-OCT-2004-19:06:49-0300><br>SUBJECT: RE: BUS SCHEDULE BETWEEN SAN FRANCISCO AND MONTEREY — $M_{11}$ |
| 12 | FROM: "BONNIE TEMPLE"<br>FROM-EMAIL: <BTEMPLE@EMAIL.COM><br>TO: CALITOURS<br>TO-EMAIL: <CALITOURS@EMAIL.COM><br>DATE: <THU-7-OCT-2004-11:35:13-+0200><br>SUBJECT: RE: BUS SCHEDULE BETWEEN SAN FRANCISCO AND MONTEREY — $M_{12}$ |

FIG. 9A

| docID | META-DATA ($M_{docID}$) | | | NEW CONTENT TEXT |
|---|---|---|---|---|
| | TO | FROM | CC | |
| 100 | TO: TOM | FROM: JOHN | CC: SALLY $M_{100}$ | HAPPY BIRTHDAY TOM! (90) |
| 101 | TO: TOM | FROM: SALLY | CC: JOHN $M_{101}$ | HAVE A GOOD ONE TOM! (WELL DONE, JOHN!) (91) |
| 102 | TO: JOHN | FROM: TOM | CC: MOM $M_{102}$ | THANKS FOR REMEMBERING JOHN! (92) |
| 103 | TO: TOM | FROM: JOHN $M_{103}$ | | NO WORIES MATE! (93) |
| 104 | TO: TOM | FROM: MOM $M_{104}$ | | JOHN ALWAYS HAD A GOOD MEMORY. I LOVE YOU SON. MOM (94) |

FIG.10

```
 ┌─PositiveVirtual: :next()
140  // Forward the virtual cursor to the next
     //document that contains the term.
     1. last = lastDescendant(Cp.docid);
     2. if (Cp.payload is shared and this.docid < last){
     3.    // not done enumerating descendants of Cp
     4.    this.docid += 1;
     5. } else {
     6.    // advance Cp and reset docid
     7.    Cp.next() ;
     8.    this.docid = Cp.docid;
     9. }

┌─PositiveVirtual : :fwdbeyond(docid d)
142  // Forward the virtual cursor to the next document
     // at or beyond document d that contains the term.
     1. if (this.docid >= d) {
     2.    // already beyond d, so nothing to do
     3.    return;
     4. }
     5. // try to forward Cp so it shares the term with d
     6. Cp.fwdshare(d);
     7. // set docid to Cp if it
     8. // is beyond d, else set it to d
     9. this.docid = max(Cp.docid, d);

┌─NegativeVirtual : : next()
144  // Forward the virtual cursor to the
     // next document not containing the term.
     1. this.docid += 1;
     2. // keep incrementing the cursor until it
     3. // is on a document not containing the term
     4. while (this.docid >= Cp.docid) {
     5.    if (Cp.payload is shared) {
     6.       this.docid = lastDescendant (Cp.docid) + 1;
     7.    } else {
     8.       this.docid = Cp.docid + 1;
     9.    }
     10.   Cp.next();
     11. }
```

FIG.20A

```
    ┌── NegativeVirtual : : fwdBeyond(docid d)
146 │   // Forward the virtual cursor to the next
    │   // document at or beyond the document d
    │   // that does not contain the term.
    1.     if (this.docid >= d) {
    2.        // already beyond d, so nothing to do
    3.        return;
    4.     }
    5.  // try to forward Cp so it shares the term with d
    6.  Cp.fwdShare(d);
    7.  this.docid = d;
    8.  if (Cp.docid > d){
    9.        // document d does not contain the term
    10.       return;
    11. }
    12. // document d contains the term
    13. // call next() to move the cursor and Cp
    14. this.next();

┌── Physical : : fwdShare(docid d)
148 │   // Try to forward the physical cursor so it shares
    │   // the term with document d. If there is no such
    │   // document, return with the cursor positioned on
    │   // the first document beyond d.
    1. while (this.docid <= d and this.docid
              does not share the term with d) {
    2.     root = root (d);
    3.     last = lastDescendant(this.docid);
    4.     if (this.docid < root) {
    5.        // the cursor is not in the
    6.        // same document tree as d
    7.        this.fwdBeyond(root);
    8.     } else if (last < d) {
    9.        // in the same document tree
    10.       // but not in the same thread
    11.       this.fwdBeyond(last + 1);
    12.    } else{
    13.       // in the same thread, but private
    14.       // posting on a different document
    15.       this.next();
    16.    }
    17. }
```

FIG.20B

INDEXING AND SEARCHING OF ELECTRONIC MESSAGE TRANSMISSION THREAD SETS

CROSS-REFERENCE TO RELATED APPLICATIONS

This application is a divisional of U.S. application Ser. No. 12/484,213, filed 14 Jun. 2009, which is a continuation of application Ser. No. 11/200,969, filed Aug. 10, 2005 (now U.S. Pat. No. 7,565,347).

FIELD OF THE INVENTION

The present invention relates to the processing of electronic text generally.

BACKGROUND OF THE INVENTION

Since its introduction to the public in the late $20^{th}$ century, email has become a popular and widely used form of communication both at home and in the workplace. In addition to the advantages email introduced to the realm of interpersonal communications, by making the delivery of written messages quicker and more convenient, email further introduced completely new benefits to the exchange of written messages.

For example, the "Reply" and "Forward" functions available to email users introduced the "discussion thread". Reference is now made to FIG. 1, which depicts an email exchange process 19 by which a discussion thread is formed. An email discussion thread is started by the transmission of a single email message 10 (the root message), from Person X to Person Y, as indicated by arrow 13. The content of email 10 is the text 20 written by Person X. This initial email transmission is defined as Round 1 of email exchange 19.

Person Y then replies, as indicated by arrow 15, to Person X, by using a conventional email "Reply" function. Use of the "Reply" function generates email 11, which contains root message text 20, and to which Person Y adds his reply text 21. This first reply is defined as Round 2 of email exchange 19.

Person X then replies to Person Y using the "Reply" function, as indicated by arrow 17, in which case his reply email 12 contains root message text 20, first reply text 21 and new reply text 22. This second reply is defined as Round 3 of email exchange 19.

One benefit of the email discussion thread is that it provides running documentation of a discussion occurring between two or more people. At any time it is possible to read the entire discussion thread beginning from the root message, and thus obtain a full picture of what was discussed, and which contributions to the discussion were made by whom, without a laborious search for documents.

Unfortunately, discussion threads significantly increase the volume of messages to be stored and processed by an email administration system. For example, the processes of indexing and searching message volumes become increasingly cumbersome with increasing message volume size.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2, 3 and 4 are detailed exemplary representations of the emails introduced in FIG. 1;

FIGS. 9 and 10 are detailed representations of the exemplary compact email volumes of FIG. 8;

FIG. 20 is a pseudocode illustration of the virtual cursor algorithms employed by the virtual cursor layer of FIG. 19.

Figure 1:
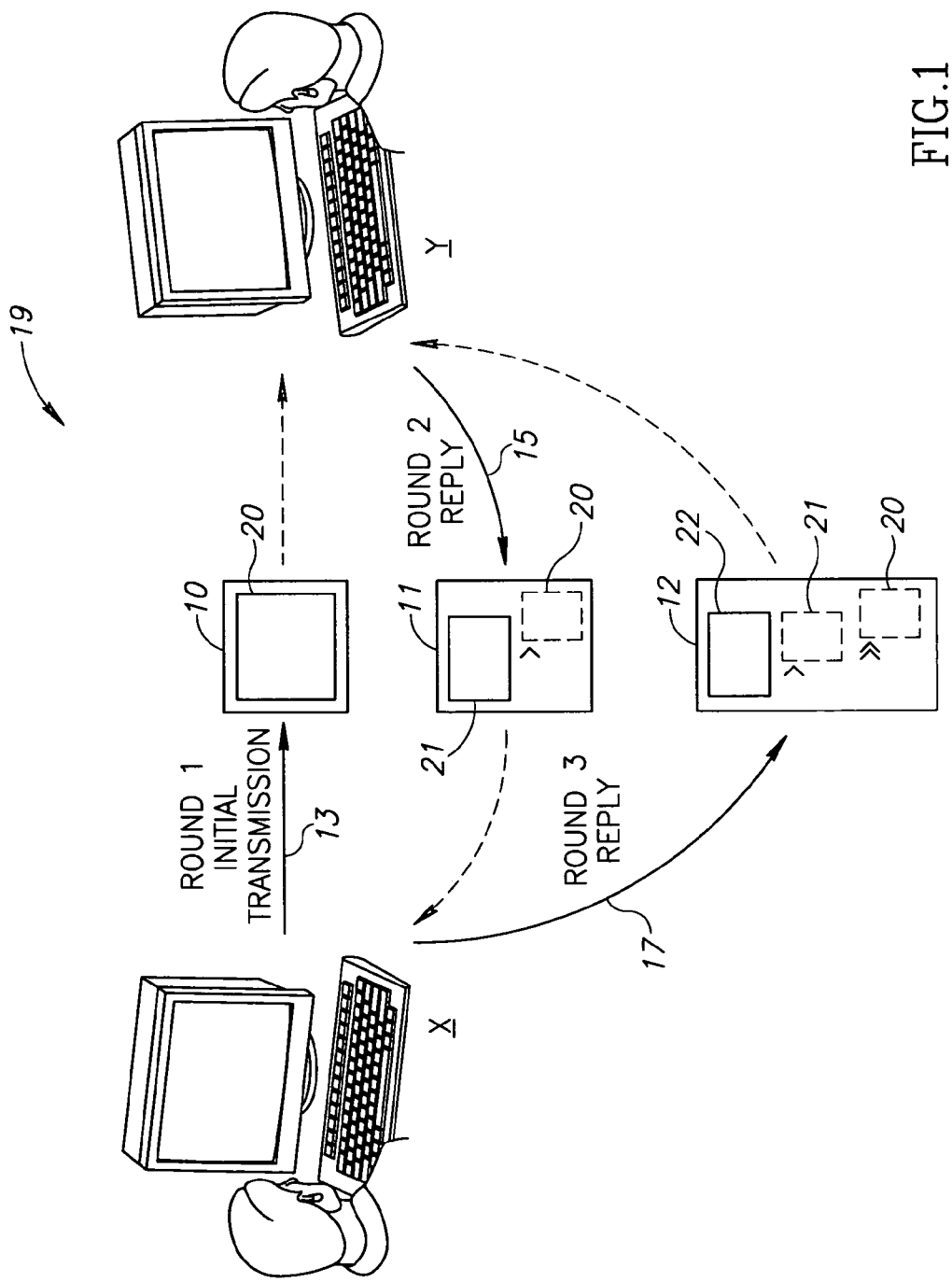
FIG. 1 is an illustration of the creation of a discussion thread during an exchange of emails.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE INVENTION

The present invention provides a novel method of indexing and searching large volumes of electronic message transmissions (EMTs).

There is provided according to embodiments of the invention a method, which is carried out by storing information describing configurations of discussion threads formed of respective series of EMTs that are exchanged among at least two individuals, the discussion threads having a root EMT, zero or more reply EMTs, and a last offspring EMT. The method is further carried out by compacting the EMT discussion threads, and indexing the compacted EMT discussion threads.

According to an aspect of the method storing information includes enumerating the EMTs by assigning numerical identifiers to the EMTs according to creation times thereof, and determining respective thread types of the EMT discussion. The thread type is selected from a linear thread type, wherein each EMT contains a full text of each preceding EMT of its respective series of EMTs, and a conjoined thread type that includes a set of EMT discussion threads that share a common root EMT. The method is further carried out by identifying the root EMT of EMT discussion threads, respectively, and identifying the last offspring EMT in the EMT discussion threads, respectively.

According to a further aspect of the method, enumerating includes assigning consecutive numerical identifiers to successive EMTs within the EMT discussion threads, wherein for respective EMT discussion threads the root EMT thereof has a lowest numerical identifier, and the last offspring EMT thereof has a highest numerical identifier.

According to still another aspect of the method, each EMT includes meta-data and new content, which the EMT adds to its discussion thread and wherein compacting includes identifying meta-data and new content of each EMT, and wherein indexing includes indexing the meta-data and the new content for the EMTs.

According to an additional aspect of the method, indexing includes distinguishing between occurrences of a term in the meta-data and in content of each EMT.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that a significant portion of the volume of email messages in an email management system may be largely due to the repetition of messages in threaded discussions. Applicants have realized that similar threaded discussions are also common in newsgroups. The present invention may be operable for all systems which have threaded discussions.

Applicants have further realized that for well-ordered threads, the pattern in which messages are repeated is typical, as shown in FIG. 1. A well-ordered email discussion thread may be defined as one in which each email in the thread may contain the full content of its predecessor, i.e., the email preceding it in the thread, with no omissions or additions. Applicants have realized that the predictability of this repetition may be exploited when processing a volume of emails, so that portions of text that are repeated numerous times in successive emails, may be processed only once, rather than the multiple times they appear. This may result in a reduced volume of text to be processed.

Figure 2:
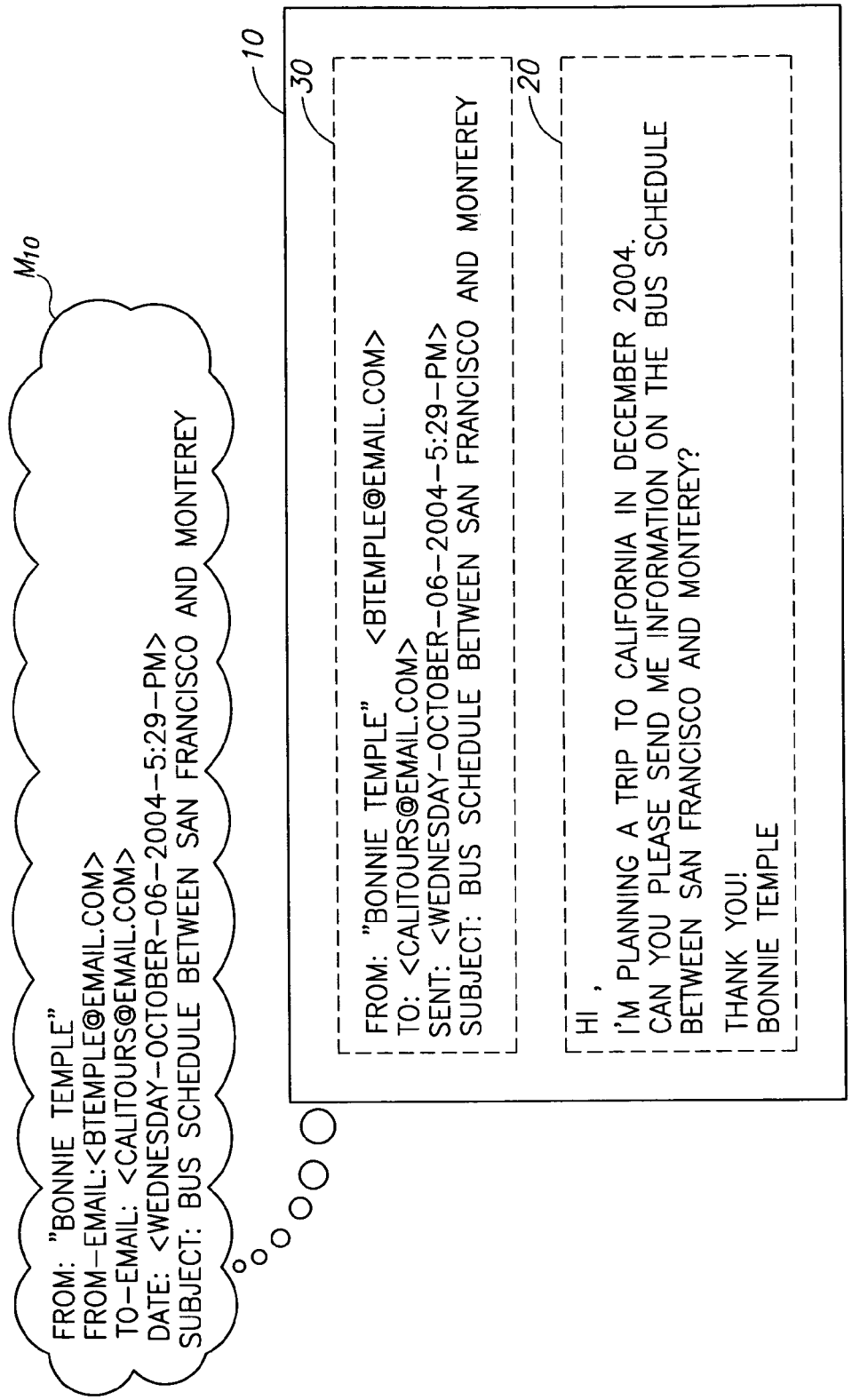

Reference is now made to FIGS. 2, 3 and 4 in which exemplary, detailed versions of emails 10, 11 and 12 comprising email exchange 19 introduced in FIG. 1 are shown. As shown in FIG. 2, exemplary email 10 contains both text 20, composed by the sender of email 10 to convey a message, and header 30, which may list some or all of the meta-data $M_{10}$ associated with email 10. Email meta-data is a record of information, logged by the email servers handling the email, regarding the sender, recipient, subject and chronology of the email. Email servers handling a volume of emails, such as the g-mail server administered by Google, may track the meta-data of all emails sent and received by the server. Email meta-data may include the names and email addresses of the email sender and the email recipient, the date and time the email was sent, and the subject of the email. This information may be stored in data fields 'From', 'From-email', 'To', 'To-email', 'Date' and 'Subject' respectively.

Electronic messages in general, of which email is one type, and of which newsgroup postings are another type, may have meta-data associated with each message transmission, as recorded by the server sending and receiving the messages.

Returning now to FIG. 2, meta-data $M_{10}$ indicates that on Wednesday, Oct. 6, 2004, at 5:29 PM, email 10, regarding the bus schedule between San Francisco and Monterey, was sent by Bonnie Temple, from email address btemple@email.com, to the email address calitours@email.com. Header 30 lists some of the meta-data $M_{10}$ information as text in email 10. The message conveyed by Bonnie Temple in content text 20 is an inquiry, for the purpose of an upcoming trip to California, about the bus schedule between the two subject California locations.

FIG. 3 shows email 11, which includes both reply text 21 and root message text 20, as explained in the background. The new content of email 11, i.e. reply text 21, is a response to Bonnie from Nelly of Calitours Inc. providing the bus schedule information requested by Bonnie. The meta-data of email 11, $M_{11}$, indicates that on Wednesday, Oct. 6, 2004, at 7:06 PM, email 11, regarding the bus schedule between San Francisco and Monterey, was sent by Calitours, from email address calitours@email.com to Bonnie Temple, at the address btemple@email.com. Meta-data $M_{11}$ may include a complete record regarding the sender, recipient, subject and chronology of email 11, even though, as shown in FIG. 3, email 11 does not contain a header listing this information as in email 10. It is also noted that the appearance of the term "Re:" in the Subject field indicates that email 11 refers to a previous message having the subject "Bus schedule between San Francisco and Monterey".

FIG. 4 shows email 12 which includes second reply text 22 in addition to first reply text 21 and root message text 20. The content of reply text 22 sent by Bonnie to Nelly conveys her gratitude for the information provided by Nelly. Meta-data $M_{12}$ indicates that on Thursday, Oct. 7, 2004, at 11:35 AM, email 12, regarding a previous message regarding the bus schedule between San Francisco and Monterey, was sent by Bonnie Temple, from email address btemple@email.com, to Calitours, at the email address calitours@email.com. Header 32 lists all of meta-data $M_{12}$ as text in email 12.

As may be seen, in an email volume containing emails 10, 11 and 12, text 20 occurs three times, text 21 occurs two times, and text 22 occurs once. The present invention may be a search engine which may generally conserve email administration system resources by exploiting the structure of email threads to index each of text sections 20, 21 and 22 one time only. The search engine may also search the index and rank search results according to retrieval policies based on the singularities of message thread structures, improving the effectiveness of the search and the quality of the results.

The search engine disclosed in the present invention may also be operable for all other types of electronic message transmission (EMT) volumes which are comprised of discussion threads, such as newsgroup postings.

Figure 5:
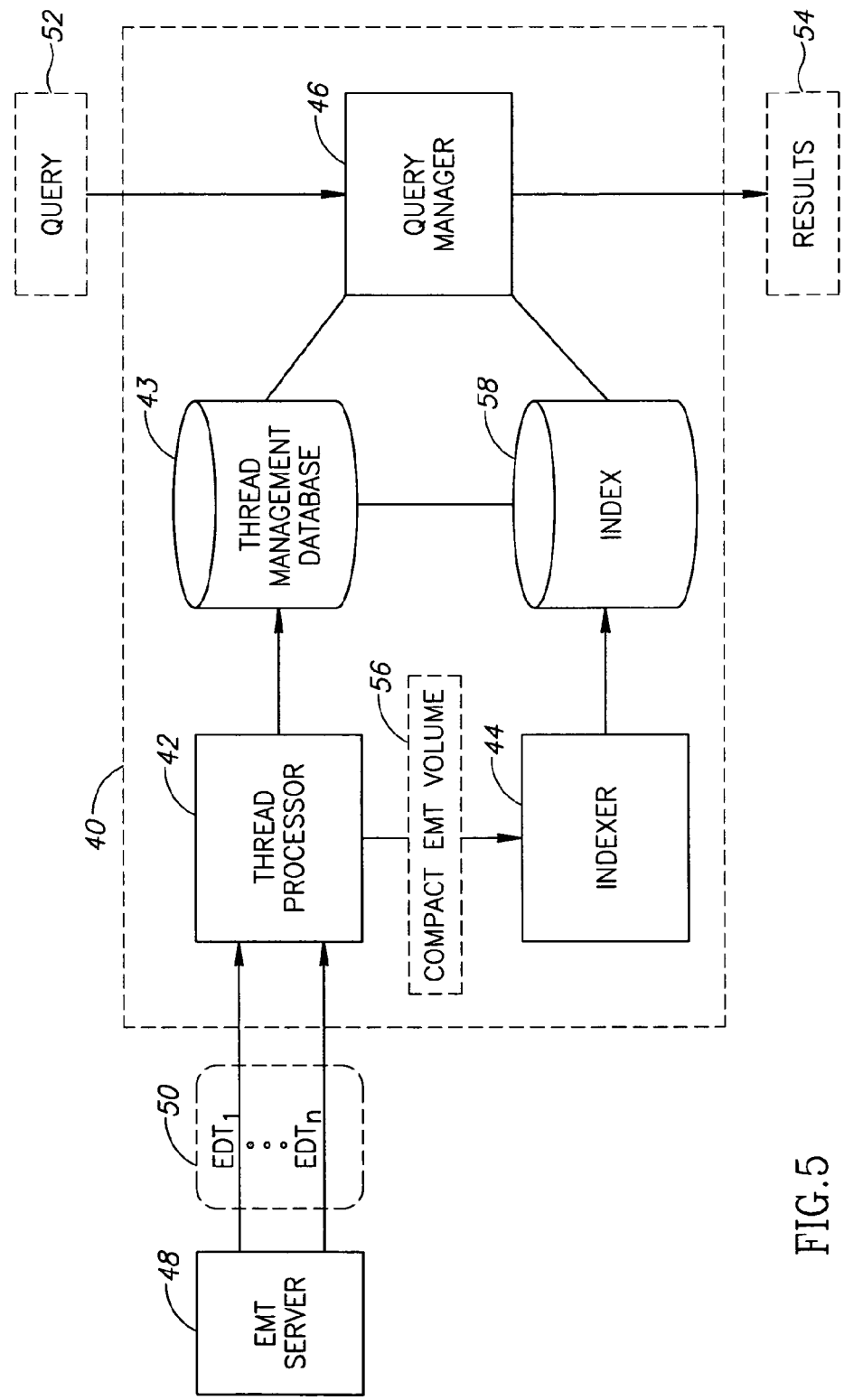
FIG. 5 is an illustration of an innovative search engine constructed and operative in accordance with a preferred embodiment of the present invention.

A preferred embodiment of the present invention may be as shown in FIG. 5, to which reference is now made, and may employ search engine 40 to analyze, index and search a volume of EMTs 50 handled by EMT server 48, which may include any number of EMT discussion threads ($edt_1 \ldots edt_n$). As shown in FIG. 5, search engine 40 may comprise a thread processor 42, an indexer 44, a thread management database 43, an index 58 and a query manager 46. Search engine 40 may support "free-text" search queries 52 regarding EMT volume 50, and may provide search results 54 in accordance with retrieval policies based on the singularities of EMT thread structures. Free text queries include Boolean expressions on required and/or forbidden, regular and/or fielded, keywords and/or phrases. For example, a query on a volume of messages may dictate that a particular word or phrase appear in a message. Query criteria may also forbid the inclusion of a certain word or phrase. In the present invention, criteria may be set for the message itself or for the fields comprising the meta-data of the message.

Returning now to FIG. 5, the EMTs comprising EMT volume 50 may be grouped into threads $edt_1 \ldots edt_n$ by EMT server 48 on the basis of the EMT meta-data logged by server 48. Server 48 may also discern, within an EMT belonging to a thread, between new text appearing in the EMT for the first time in the thread, and repetitions of text from preceding messages, on the basis of the meta-data logged by server 48 for the EMTs in the thread.

Thread processor 42 may analyze threads $edt_1 \ldots edt_n$ to ascertain their structures, assign identification numbers to each EMT, and compile thread structure reference tables, described in more detail hereinbelow, defining the structures of the EMT threads. Thread structure information processed by thread processor 42 may be stored in thread management database 43. The output of thread processor 42 may be a compact EMT volume 56, which may be smaller in size than original volume 50. The reduced EMTs which form compact EMT volume 56 may consist of the new text contribution of each EMT in a thread and its meta-data, and may not include repetitions of text from preceding EMTs in the thread. Indexer 44 may create a traditional inverted index 58 for compact EMT volume 56. Query manager 46 may process queries 52 input into search engine 40 by accessing thread management database 43 and index 58. Query manager 46 may return search results 54 in response to query 52.

Figure 6:
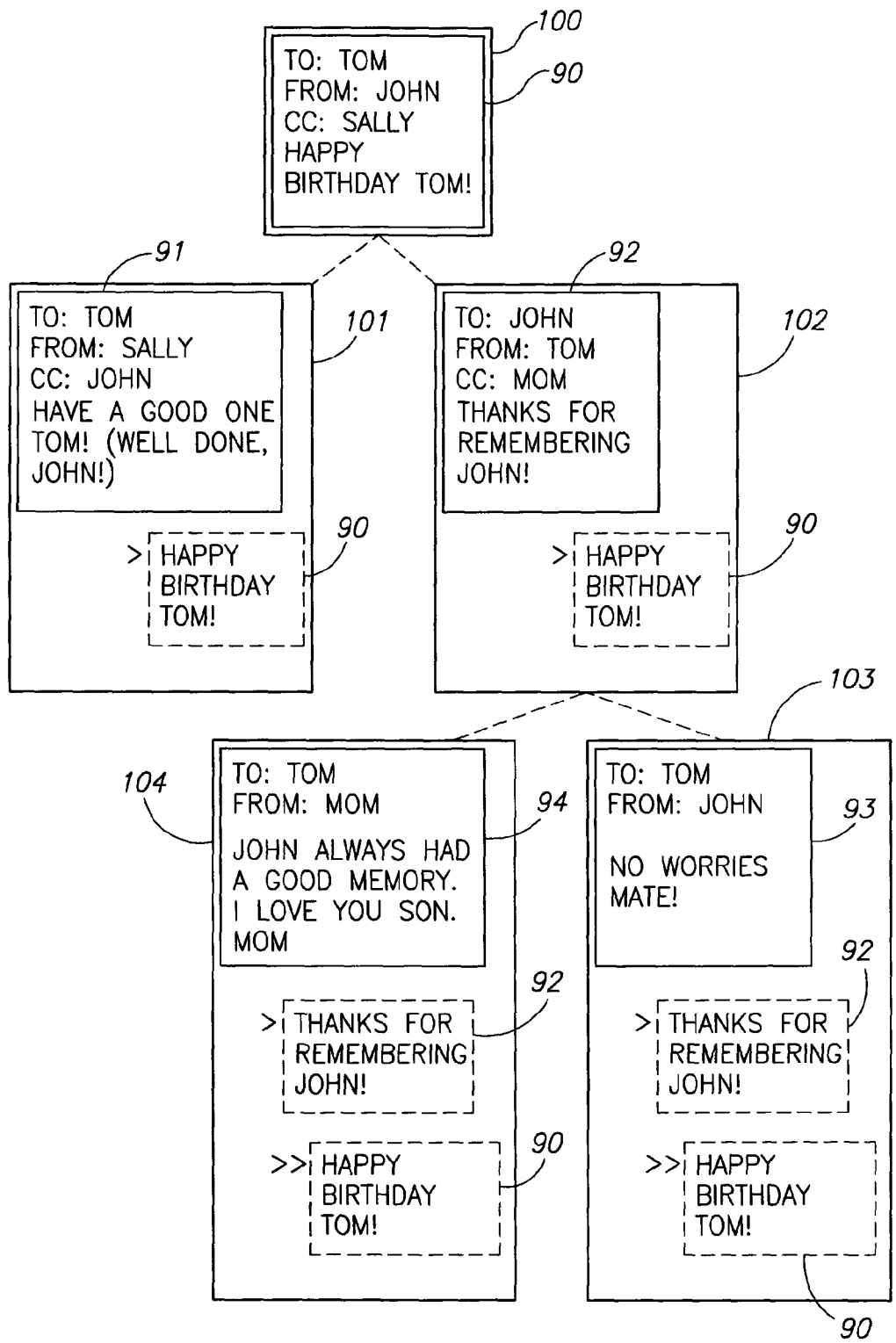
FIG. 6 is an exemplary conjoined email thread set.

EMT threads $edt_1 \ldots edt_n$ may have characteristic structural configurations, e.g. linear or conjoined. The exemplary email thread shown in FIG. 1 is a linear thread. Each message in a linear thread contains the full text of all preceding messages in the thread. FIG. 6, to which reference is now made, shows an exemplary conjoined thread set.

As shown in FIG. 6, conjoined thread sets may occur when more than two people are involved in an electronic message discussion initiated by a single root message. In the example shown in FIG. 6, root email 100 is sent from John to Tom, but a copy is also sent to Sally. The copy sent to Sally precipitates a discussion between Sally and Tom which occurs in parallel with the discussion occurring between Tom and John, while the initial email from which both discussions evolved remains root email 100. Another branch to the tree is added when Tom copies his reply to John (email 102) to Mom, and Mom replies (email 104) to Tom.

Figure 7:
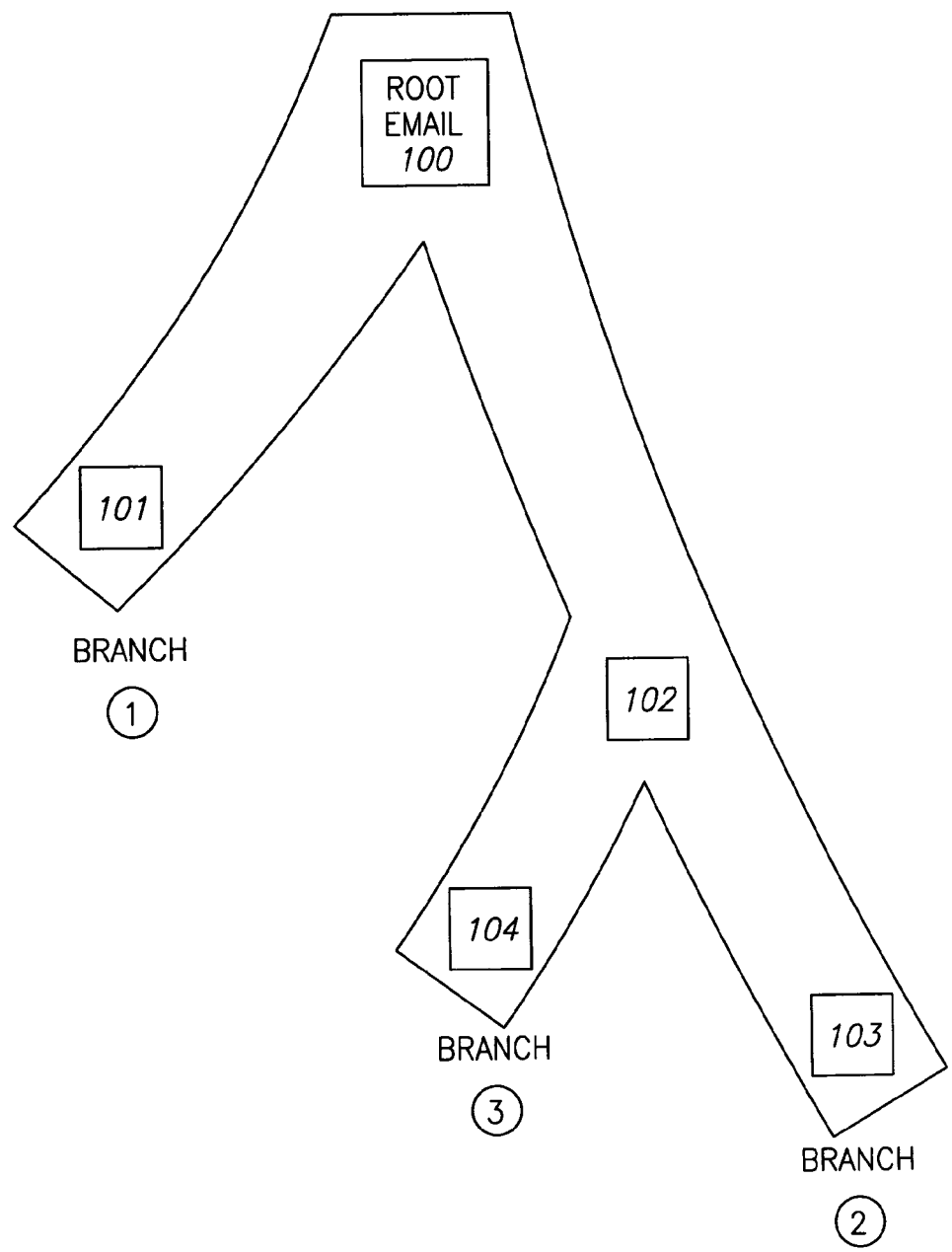
FIG. 7 is a graphical illustration of the tree-like structure of the conjoined thread set introduced in FIG. 6.

In a conjoined thread set configuration, such as that depicted in FIG. 6, discussions may split at any point, spinning off sub-threads. A conjoined thread set may be defined as a set of threads all sharing the same root message. Neither thread may be fully contained in the other, and beyond the common root message, the messages in the two threads may be disjoint. A set of conjoined threads may be seen as a directed tree, rooted at the root message. The tree-like structure of the conjoined thread set shown in FIG. 6 is emphasized graphically in FIG. 7, reference to which is now made. FIG. 7 shows that the exemplary conjoined thread set of FIG. 6 is rooted at root email 100 and has three branches concluding with emails 101, 103 and 104. The tree may be the union of the linear graphs defined by the individual threads in the conjoined set. A linear thread may therefore be seen as special and simple occurrence of a conjoined thread set.

Figure 8:
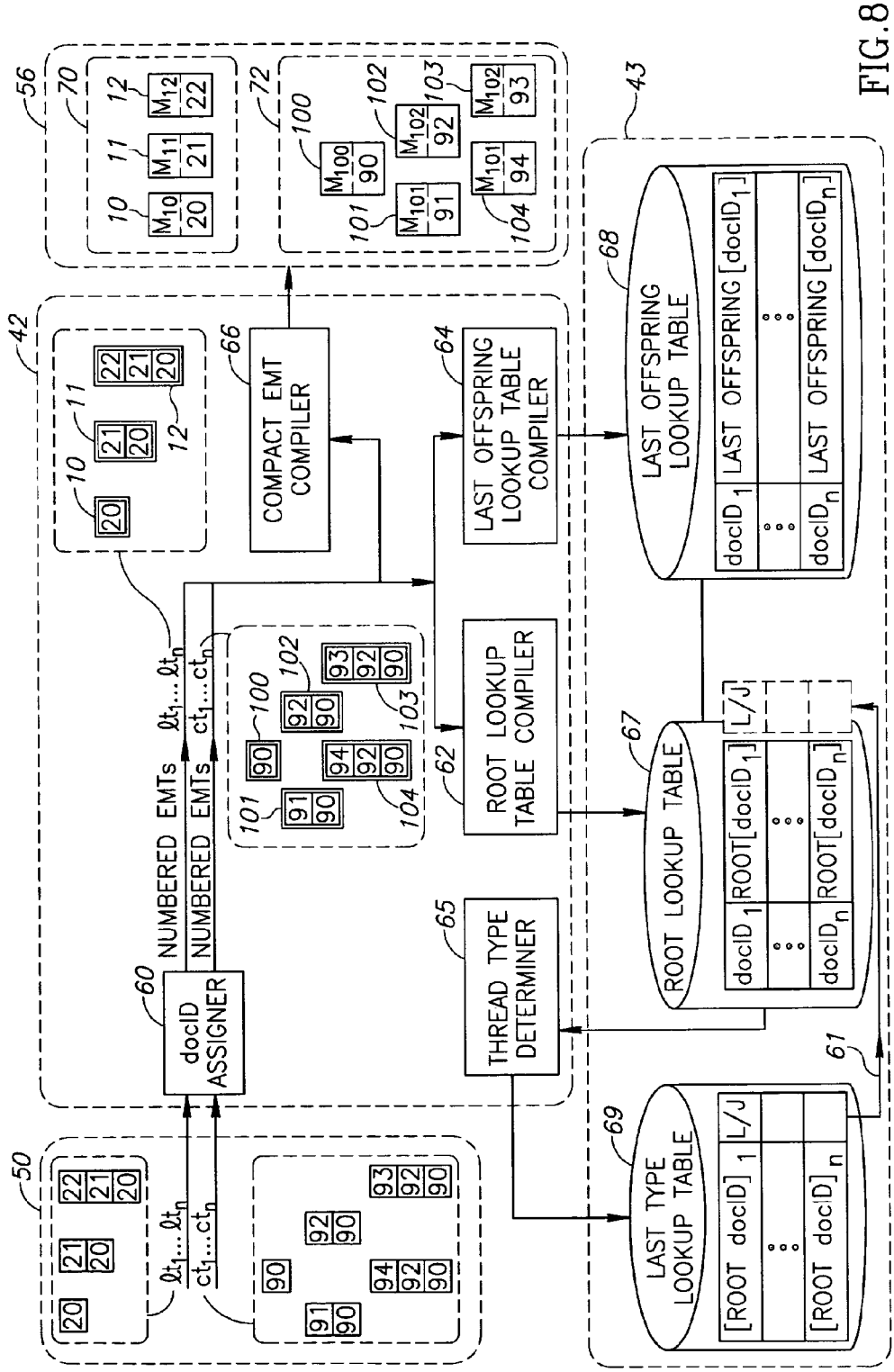
FIG. 8 is a block diagram illustration of the details of the thread processor of FIG. 5.

Reference is now made to FIG. 8 which shows the operation of thread processor 42 in detail. Thread processor 42 may comprise a docID assigner 60, a root lookup table compiler 62, a last offspring lookup table compiler 64, a thread type determiner 65 and a compact EMT compiler 66. Input 50 for thread processor 42 may be a collection of any number of EMT discussion threads ($edt_1 \ldots edt_n$), including linear threads ($lt_1 \ldots lt_n$) and conjoined thread sets ($ct_1 \ldots ct_n$). As shown in FIG. 8, the exemplary linear thread introduced in FIG. 1 shall be referred to as thread $lt_1$ for the purposes of this discussion. Similarly, the exemplary conjoined thread set introduced in FIG. 6 shall be referred to as thread $ct_1$.

For linear EMT threads $lt_1 \ldots lt_n$, docID assigner 60 may assign consecutive numerical IDs (docIDs) to sequential EMTs on the basis of document creation time stored in the EMT meta-data. For conjoined thread sets $ct_1 \ldots ct_n$, DocID assigner 60 may use Depth First Search (DFS) numbering, as is well known in the art, on the directed tree implied by the thread-set, starting from the root document.

Root lookup table compiler 62 may analyze threads $edt_1 \ldots edt_n$ and may compile a root lookup table 67 listing the root EMT docID for every assigned docID. Last offspring lookup table compiler 64 may analyze threads $edt_1 \ldots edt_n$ and may compile a last offspring lookup table 68 listing the last offspring EMT docID for every assigned docID. The last offspring EMT of EMT X is defined as the EMT having the highest docID of all EMTs of which X is an ancestor. Taken together, root lookup table 67 and last offspring table 68 may effectively provide complete structural descriptions for all email threads $edt_1 \ldots edt_n$.

Thread type determiner 65 may then analyze the data in root lookup table 67 and last offspring lookup table 68 to determine whether a group of EMTs belonging to a thread $edt_i$ form a linear thread $lt_i$ or a conjoined thread set $ct_i$. Thread type determiner 65 may compile this information in thread type lookup table 69 in which the value "L" (linear) or "J" (conjoined) may be assigned to each Root docID in root lookup table 67. Thread type determiner 65 may identify that a root docID is the root of a linear thread if the root docID is common to a group of consecutive docIDs which also share a common Last Offspring docID. Thread type determiner 65 may identify that a root docID is the root of a conjoined thread set if the root docID is common to a group of consecutive docIDs which have differing Last Offspring docIDs.

It is noted that the thread type data may be joined, as shown by arrow 61, to root lookup table 67 so that each docID in the system may be identifiable as belonging to a linear thread or to a conjoined thread set.

Compact EMT compiler 66 may compile compact EMT volume 56 by associating, with each assigned docID, the meta-data and the new text content associated with that docID.

Exemplary compact email volumes, 70 and 72, for exemplary linear and conjoined email threads $lt_1$ and $ct_1$ respectively, are shown in FIG. 8. It may be seen that the compact emails constituting compact email volumes 70 and 72 may be comprised of the email meta-data and new content text associated with each email docID. For example, it is shown in FIG. 8 that compact email 10 may comprise the meta-data associated with email 10, indicated by the notation $M_{10}$, and text 20, the new text contribution in email 10. The contents of compact emails 11, 12, 100, 101, 102, 103 and 104 are similarly indicated in FIG. 8.

The reduction in volume realized by compact EMT compiler 66 may be seen by comparing the original volumes of email threads $lt_1$ and $ct_1$ and compact volumes 70 and 72, respectively, represented graphically in FIG. 8. Compact email volumes 70 and 72 may comprise only one copy of each new message text portion, rather than the multiple repetitions of the text portions occurring in the non-compacted email threads.

Figure 9B:
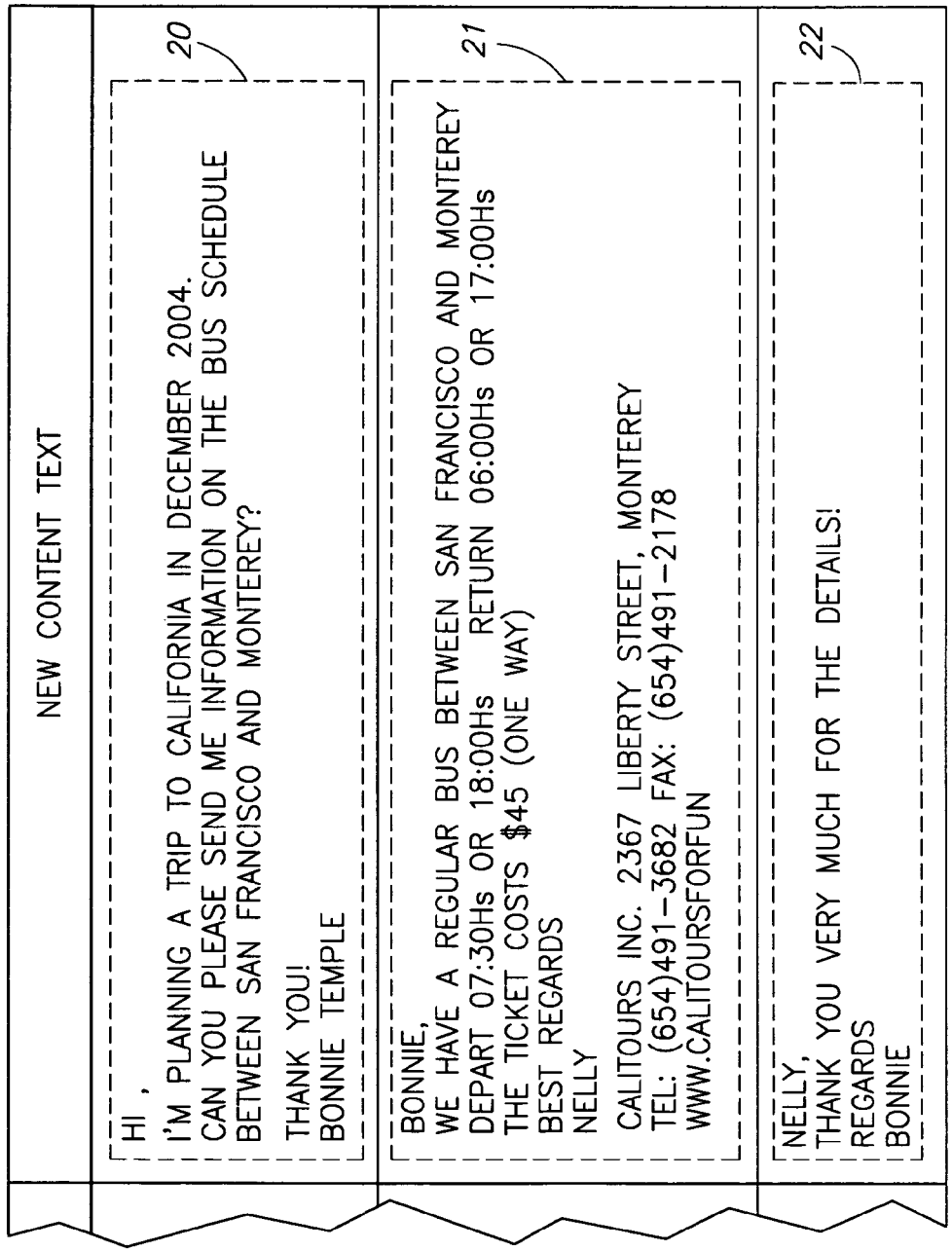

Detailed representations of compact email volumes 70 and 72 are shown in FIGS. 9 and 10 respectively, reference to which is now made. Compact email volume 70 for linear message thread $lt_1$, as shown graphically in FIG. 8, and in detail in FIG. 9, may include the meta-data of emails 10, 11 and 12 ($M_{10}$, $M_{11}$ and $M_{12}$), and only the new message content of each email, i.e. one copy of message text portions 20, 21 and 22, respectively. A significant reduction in indexed message volume may thus be achieved by the present invention, as the original volume of message thread $lt_1$ may include three copies of text portion 20, two copies of text portion 21 and one copy of text portion 22 as shown in FIG. 8.

Similarly, compact email volume 72 for conjoined thread $ct_1$, as shown graphically in FIG. 8, and in detail in FIG. 10, may include the meta-data of emails 100-104, ($M_{100}$, $M_{101}$, $M_{102}$, $M_{103}$, and $M_{104}$), and only the new message content of each email, i.e. one copy of message text portions 90-94 respectively. A significant reduction from the original volume of message thread $ct_1$, which may include five copies of text portion 90, three copies of text portion 92 and one copy each of text portions 91, 93 and 94, as shown in FIGS. 6 and 8, is thus realized.

Figure 11A:
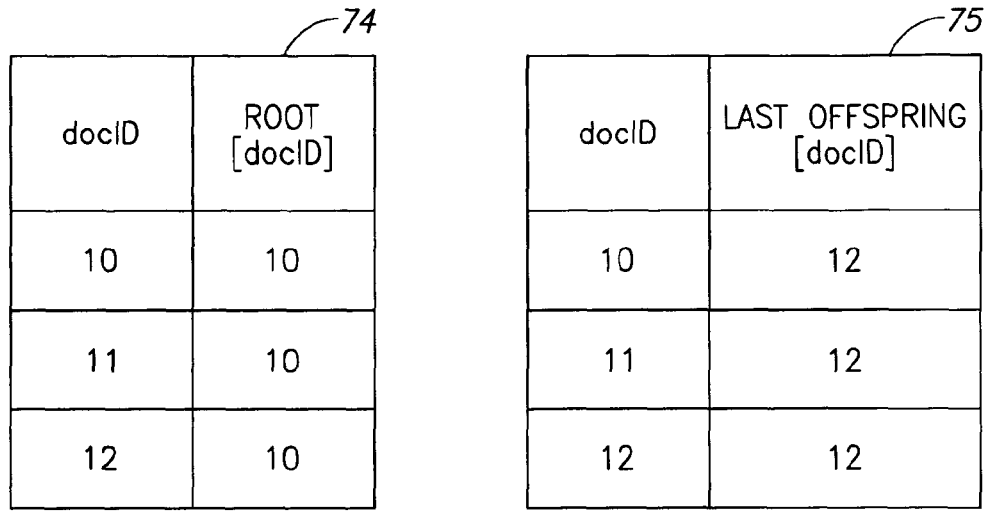
FIGS. 11a and 11b are graphical illustrations of the root lookup and last offspring data for the exemplary compact email threads of FIGS. 9 and 10.
Figure 11B:
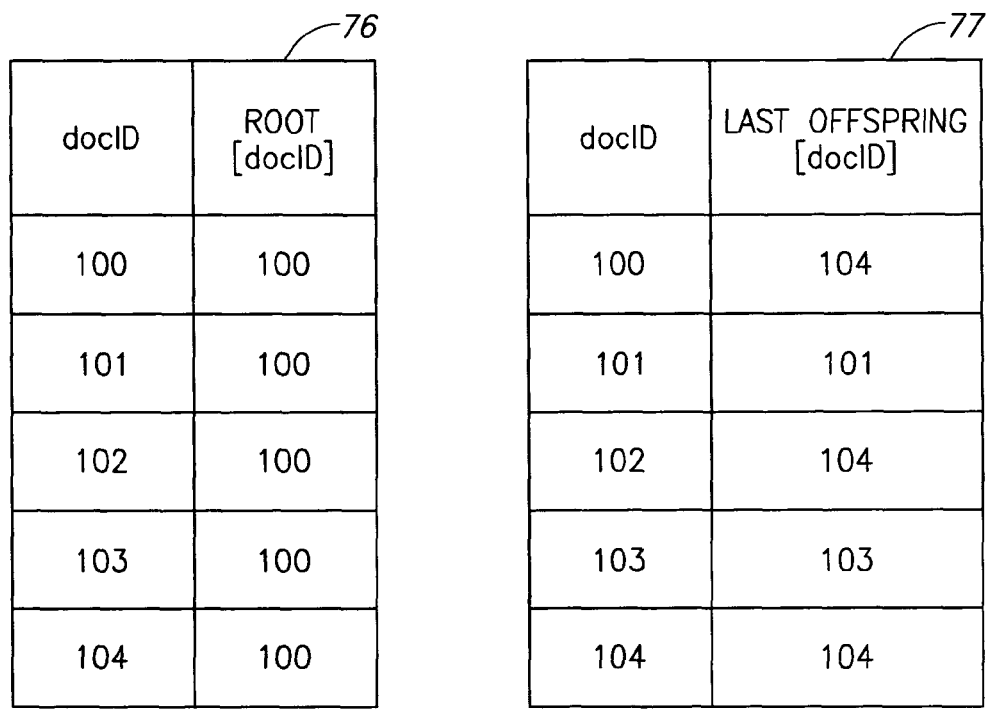

Reference is now made to FIGS. 11a and 11b which show the root and last offspring lookup data for email threads $lt_1$ and $ct_1$ respectively. Root lookup table 74 for linear thread $lt_1$ and root lookup table 76 for conjoined thread $ct_1$ are shown separately in FIGS. 11a and 11b respectively for the sake of clarity, although as described in FIG. 8, all root lookup data for an entire email volume may be compiled in one table in a preferred embodiment of the present invention. Similarly, all last offspring lookup data for an email volume may be compiled in one table in a preferred embodiment of the present invention. For the sake of clarity however, the last offspring data for threads $lt_1$ and $ct_1$ are presented separately in tables 75 and 77 in FIGS. 11a and 11b respectively.

A cursory review of these four tables may indicate how the structures of both linear and conjoined threads, and the distinction between them, may be completely described by the combination of root lookup table 67 and last offspring lookup table 68. Out of a volume of random emails 50, a thread may be distinguished as a group of emails having the same root email, such as emails 10, 11 and 12 all sharing root email 10 as shown in table 74 of FIG. 11a, and such as emails 100-104 all sharing root email 100 as shown in table 76 of FIG. 11b. Accordingly, for a root lookup table having thousands of entries for an email server volume 50, all docIDs sharing the same root may belong to one thread.

Last offspring lookup table 68 may provide the information necessary to distinguish linear threads from conjoined thread sets. A group of consecutively numbered emails which share their root email and their last offspring email is defined as a linear thread. As shown in FIG. 11a, email thread $lt_1$ meets this criteria, since all emails 10-12 in the thread share root email 10 and last offspring email 12. As shown in FIG. 11b, email thread $ct_1$ does not meet this criteria. While emails 100-104 share root email 100, there are three different last offspring docIDs among them. The last offspring of email 101 is email 101, the last offspring of email 103 is email 103, and the last offspring of emails 100, 102 and 104 is email 104. A group of consecutively numbered emails which have a common root email, but a variety of last offspring is defined as a conjoined thread set. Returning briefly to FIG. 7, where the three branches of conjoined thread $ct_1$, correlating to last offspring emails 101, 103 and 104, are depicted graphically, it is shown that the number of unique last offspring docIDs for a conjoined thread set equals the number of branches in the thread.

Figure 12:
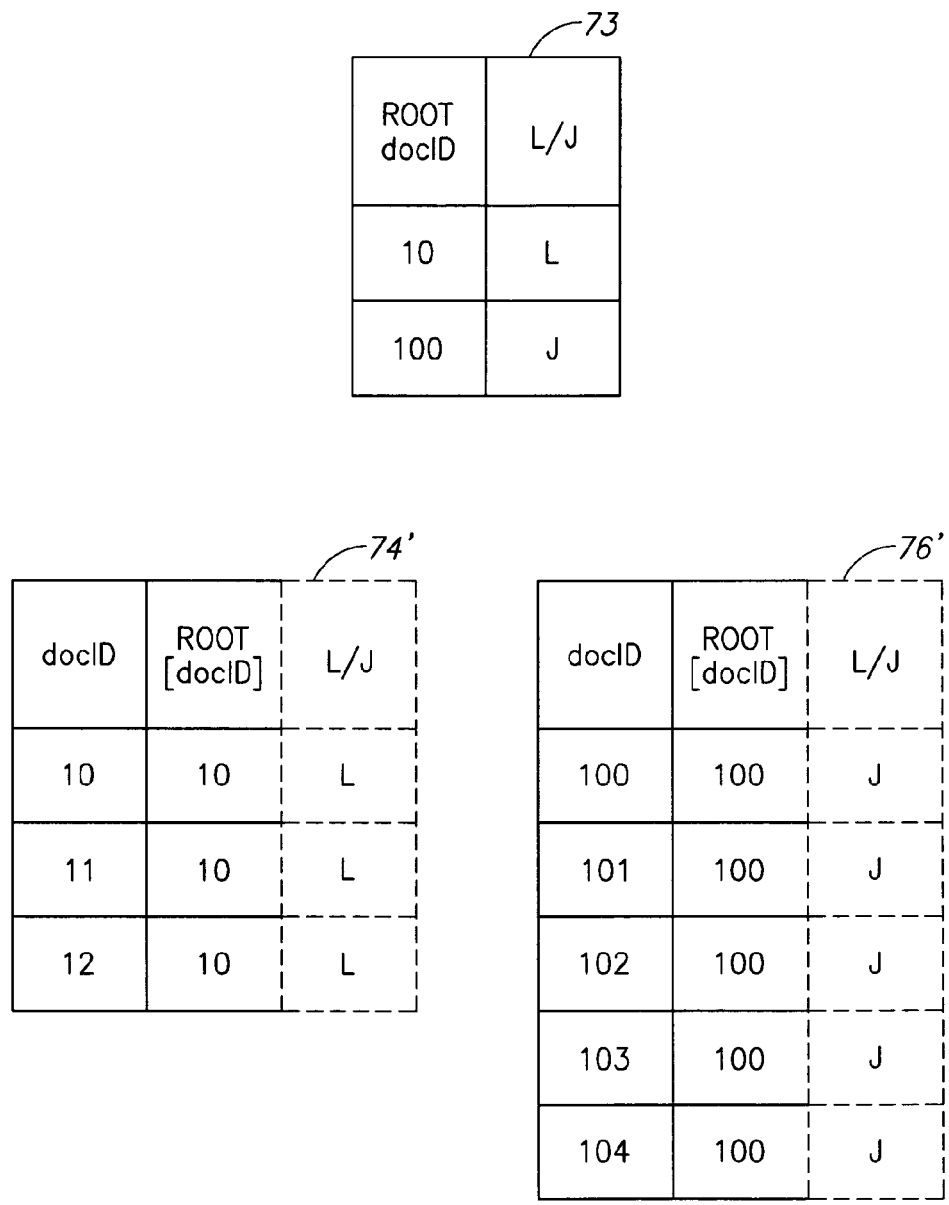
FIG. 12 is a graphical illustration of the thread type data for the exemplary compact email threads of FIGS. 9 and 10.

Reference is now briefly made to FIG. 12 which shows thread type lookup table 73 for exemplary email threads $lt_1$ and $ct_1$. In table 73 the root docID of each thread and its associated thread type are tabulated. The associated thread type for exemplary linear thread $lt_1$ whose root docID is 10, is shown to be "L" (linear), and the associated thread type for exemplary conjoined thread $ct_1$ whose root docID is 100, is shown to be "J" (conjoined).

As explained previously in the discussion of FIG. 8, the thread type data in table 73 may alternatively be joined to root lookup table 67. As shown in FIG. 12, table 74' shows root lookup table 74 of FIG. 11a augmented with thread type data. Table 76' similarly shows root lookup table 76 of FIG. 11b augmented with thread type data.

Figure 13:
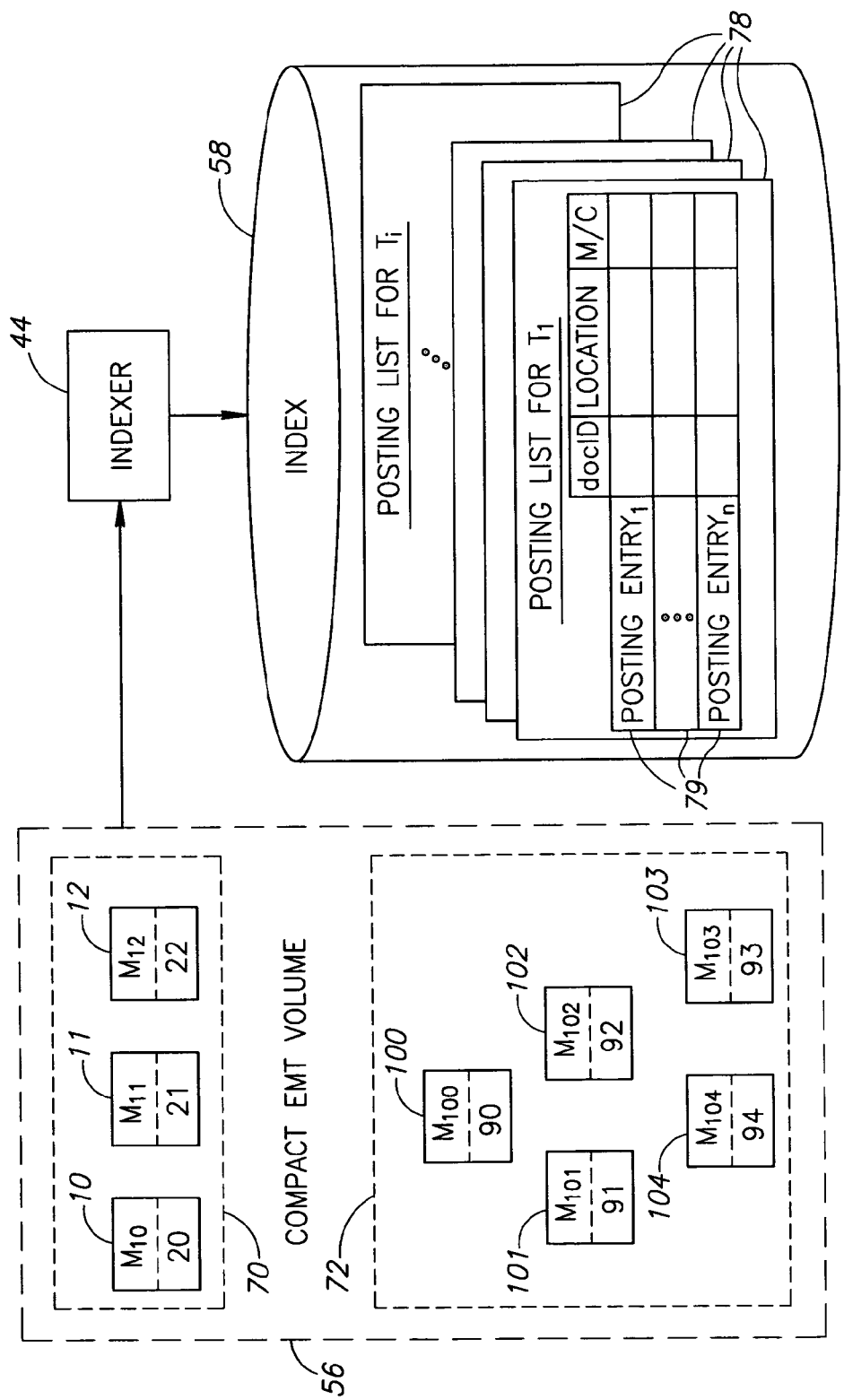
FIG. 13 is a block diagram illustration of the details of the indexer of FIG. 5.

Reference is now made to FIG. 13 which shows the operation of indexer 44 in detail. Indexer 44 may generate an inverted index 58 for compact EMT volume 56. The output of indexer 44 may comprise posting lists 78 for unique words (tokens) $T_1$ through $T_i$ appearing in both the content and the meta-data of the compacted EMTs comprising compact EMT volume 56. Each posting list 78 may store an ordered set of posting entries 79 where each entry may indicate the docID in which the token appeared, the specific location of the token within the meta-data or content, and whether the token appeared in the meta-data ("M") or in the content ("C") of the EMT. This information may be recorded as a triplet (docID, location, meta or content).

The value recorded in the second field indicating the location of the token in the docID may refer to a word count position in the meta-data of the EMT if the value in the third field is an "M", or to a word count position in the content of the EMT if the value in the third field is a "C".

Figure 14:
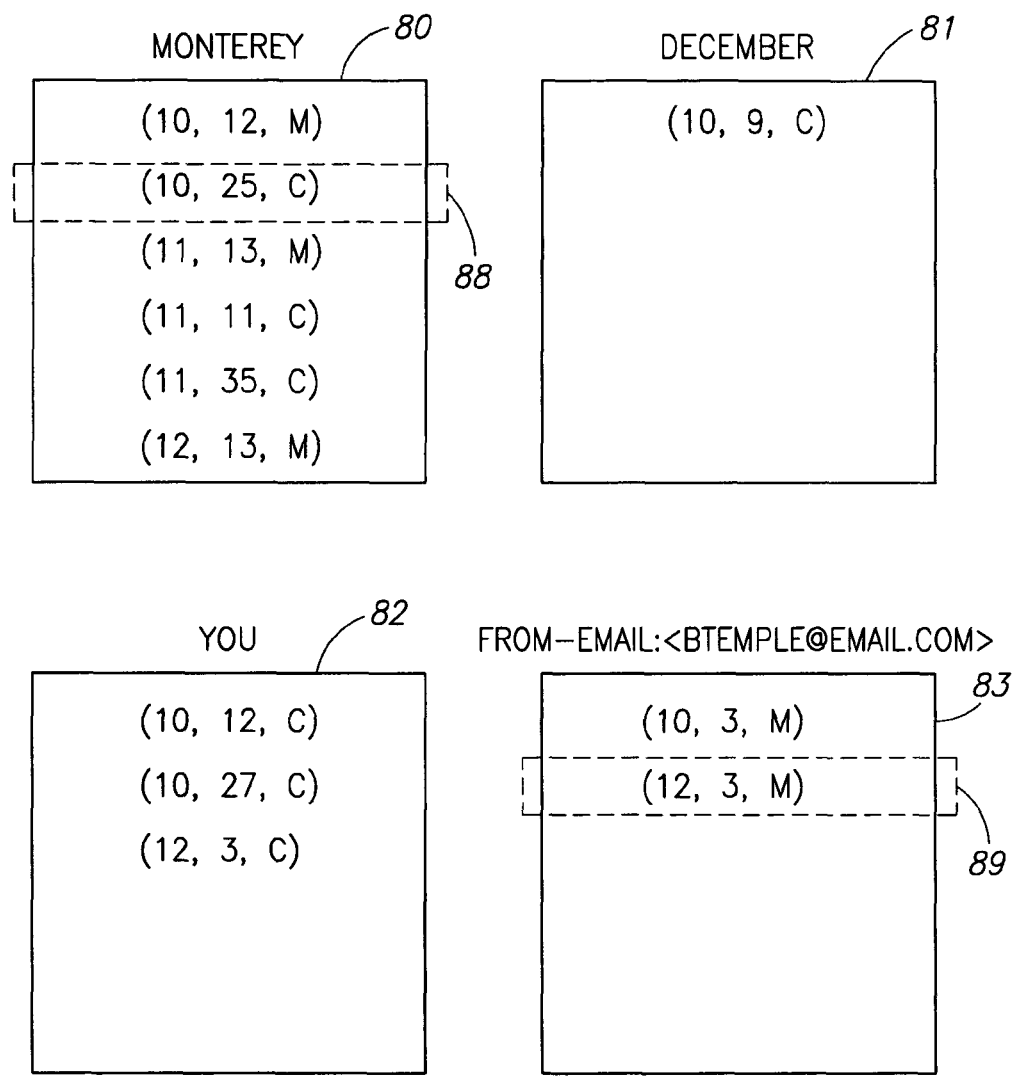
FIGS. 14 and 15 are graphical illustrations of exemplary posting lists of the index of FIG. 13.
Figure 15:
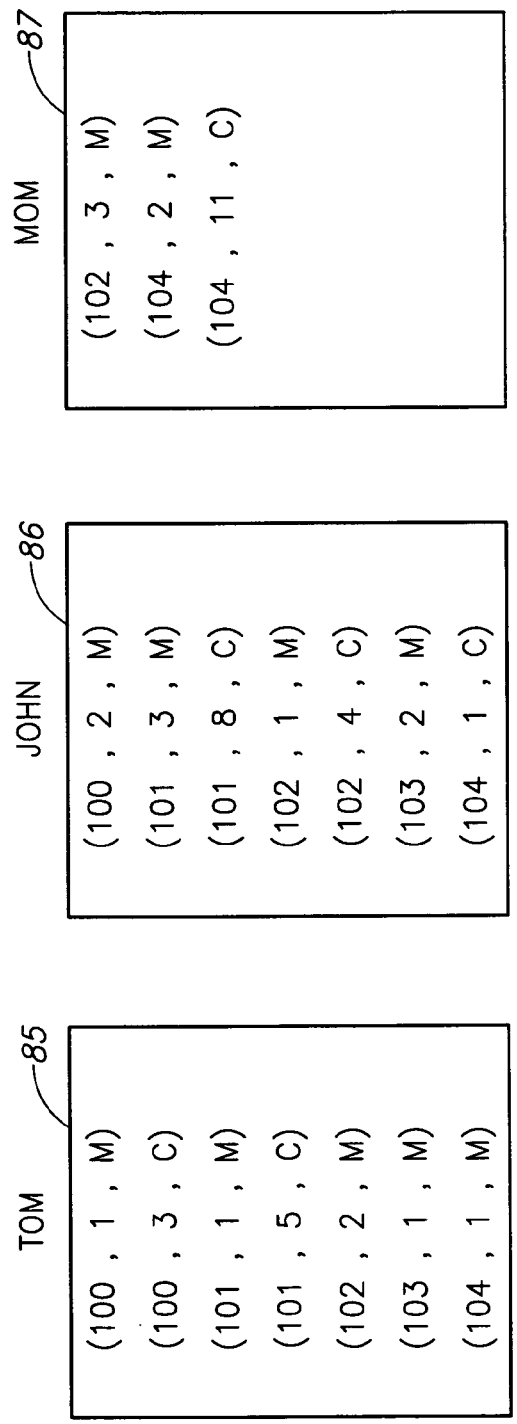

Reference is now made to FIGS. 14 and 15 which show exemplary posting lists 78 for compact email volumes 70 and 72 shown in FIGS. 9 and 10 for exemplary email threads $lt_1$ and $ct_1$ respectively. In FIG. 14, posting list 80 shows posting entries for the token "Monterey". Posting list 81 shows posting entries for the token "December", posting list 82 for the token "you", and posting list 83 for the token "btemple@email.com" appearing in the From-email field of the email meta-data. The three values (10, 25, C) recorded in exemplary posting entry 88, indicate that the token 'Monterey' appears in docID number 10, in word position number 25 of the message content as can be seen in FIG. 9. The three values (12, 3, M) recorded in exemplary posting entry 89, indicate that the token '<btemple@email.com>' appears in word position number 3 after the colon sign following the 'From:' field in the meta-data of docID number 12 as can also be seen in FIG. 9.

In FIG. 15, exemplary posting lists 85, 86 and 87 list posting entries for the tokens "Tom", "John" and "Mom", respectively, as they appear in compact email volume 72 of FIG. 10.

Figure 16A:
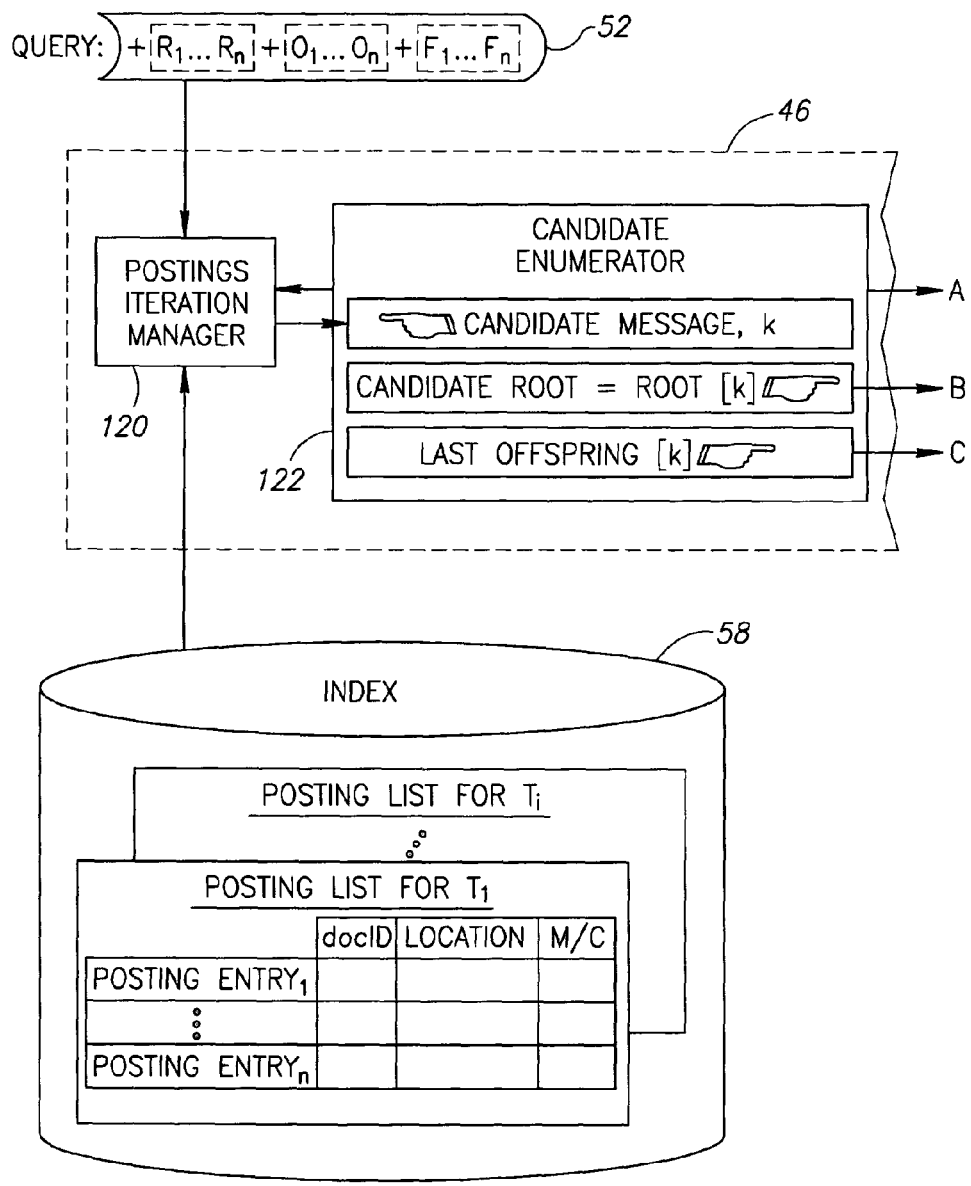
FIG. 16 is a block diagram illustration of the details of the query manager of FIG. 5.
Figure 16B:
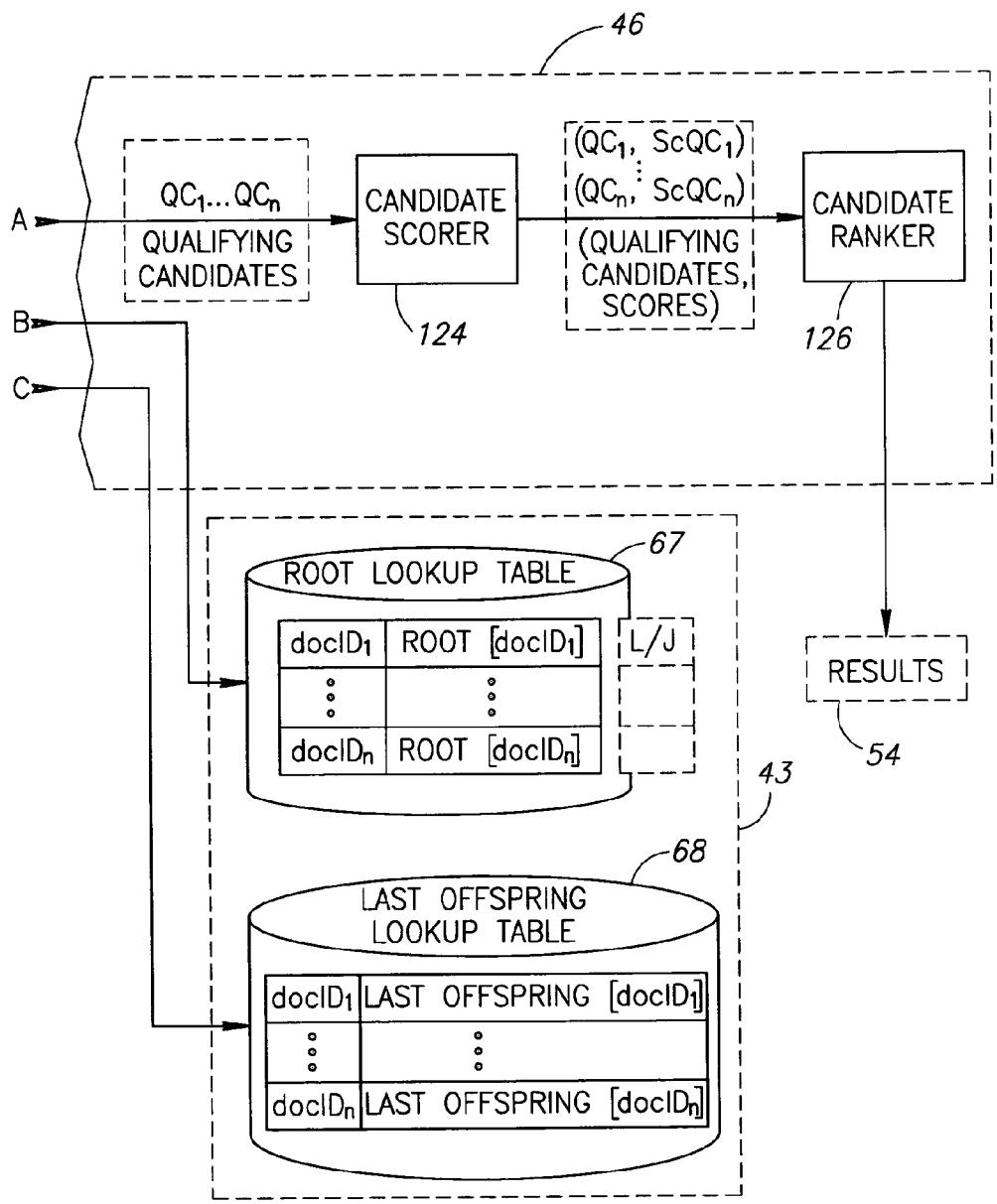

Reference is now made to FIG. 16 which describes the operation of query manager 46 in detail. Query manager 46 may utilize the information about the thread structures stored in thread management database 43 to process user-input queries 52 regarding EMT volume 50 in a generally more time and resource efficient manner than if volume 50 were searched as an assortment of random unrelated text. The information about the EMT thread structures stored in thread management database 43 may organize EMT volume 50 into its component threads, and query manager 46 may navigate among these threads using the thread structure information as a map as discussed in further detail in FIGS. 17 and 18. Owing to the map provided by the thread structure information, query manager 46 may conduct selective searches of EMT volume 50. For example, in the present invention, query manager 46 may anticipate that a forbidden term found in a root email may appear in all subsequent emails in the thread and thus, the subsequent emails may all be disqualified immediately without being searched. Query manager 46 may anticipate these and other particularities of threaded EMT discussions, and may exploit them to optimize the efficiency of the searching, scoring and ranking processes.

Query manager 46 may accomplish the task of guided systematic and selective searching of EMT volume 50, by beginning at a certain start point, i.e., by selecting one message candidate, and then, in an iterative process, using the rules and conditions prescribed in the algorithms disclosed hereinbelow to validate or disqualify that candidate, and to determine the next candidate to be checked. Query manager 46 may conserve system resources by skipping around message volume 50 to select candidates as dictated by the thread-savvy algorithms.

In accordance with a preferred embodiment of the present invention, query manager 46 may conduct a selective, time and resource efficient search of a message volume 50 as described above without any loss of recall, that is, without failing to retrieve qualifying results to a query due to the shortcuts taken in the indexing and search processes.

Returning now to FIG. 16, query 52 may consist of required terms $R_1 \ldots R_n$, forbidden terms $F_1 \ldots F_n$ and optional terms $O_1 \ldots O_n$. Generally speaking, an email may not be a qualifying result in response to query 52 if it does not contain appearances of required terms $R_1 \ldots R_n$. An email may also not be a qualifying result in response to query 52 if it contains an appearance of any forbidden term $F_1 \ldots F_n$. An email not disqualified for containing forbidden terms and containing any of optional terms $O_1 \ldots O_n$ may be more likely to be returned as a result response to query 52 than an email not containing any of optional terms $O_1 \ldots O_n$.

As shown in FIG. 16, query manager 46 may comprise a postings iteration manager (PIM) 120, a candidate enumerator (CE) 122, a candidate scorer 124 and a candidate ranker 126.

Candidate enumerator 122 may employ postings iteration manager 120 in an iterative process in which, at any given time, one docID, the CandidateMessage, may be under consideration for qualifying as a search result for query 52. Postings iteration manager 120 may traverse posting lists $PL_1 \ldots PL_n$ of required terms $R_1 \ldots R_n$, optional terms $O_1 \ldots O_n$ and forbidden terms $F_1 \ldots F_n$ of query 52. Candidate enumerator 122 may maintain three message pointers—CandidateMessage, CandidateRoot, and LastOffspring. The pointer CandidateMessage may point to the document ID $docID_i$ under consideration for candidacy as a response to query 52 at any given time. The pointer CandidateRoot may point to the root docID of $docID_i$, and the pointer LastOffspring may point to the last offspring docID of $docID_i$. The iterative process of candidate enumeration and examination for qualification performed by CE 122 and PIM 120 is discussed in greater detail with respect to FIGS. 17 and 18.

A message meeting the search criteria, i.e. a qualifying candidate $QC_i$, may proceed to candidate scorer 124 for scoring. Qualifying candidates $QC_1 \ldots QC_n$ and their associated scores, $ScQC_1 \ldots ScQC_n$ may proceed to candidate ranker 126 for ranking.

Candidate scorer 124 may assign scores to qualifying candidates $QC_1 \ldots QC_n$, with 'better' candidates receiving higher scores. For example, a candidate email containing a certain number of optional terms $O_1 \ldots O_n$ may be assigned a higher score than a candidate email containing a lesser number of optional terms $O_1 \ldots O_n$. Candidate ranker 126 may assess the candidate scores on the basis of the retrieval policies of search engine 40, and may assess which qualifying candidates may be returned by the search engine as results to query 52. The retrieval policies of search engine 40 may be system or user defined.

Figure 17A:
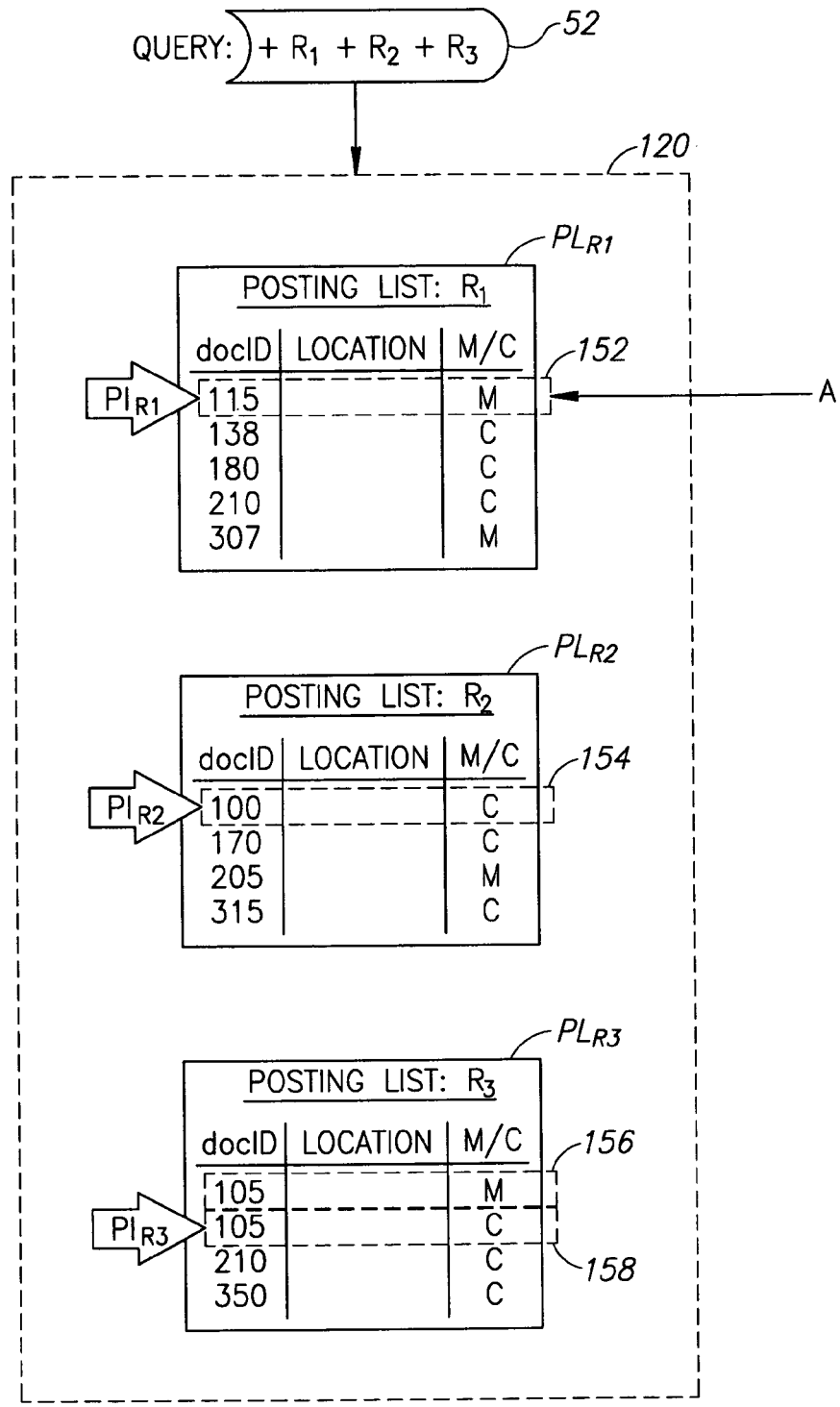
FIG. 17 is a block diagram illustration of the initial steps of an exemplary candidate enumeration and verification process, introduced in FIG. 16.
Figure 17B:
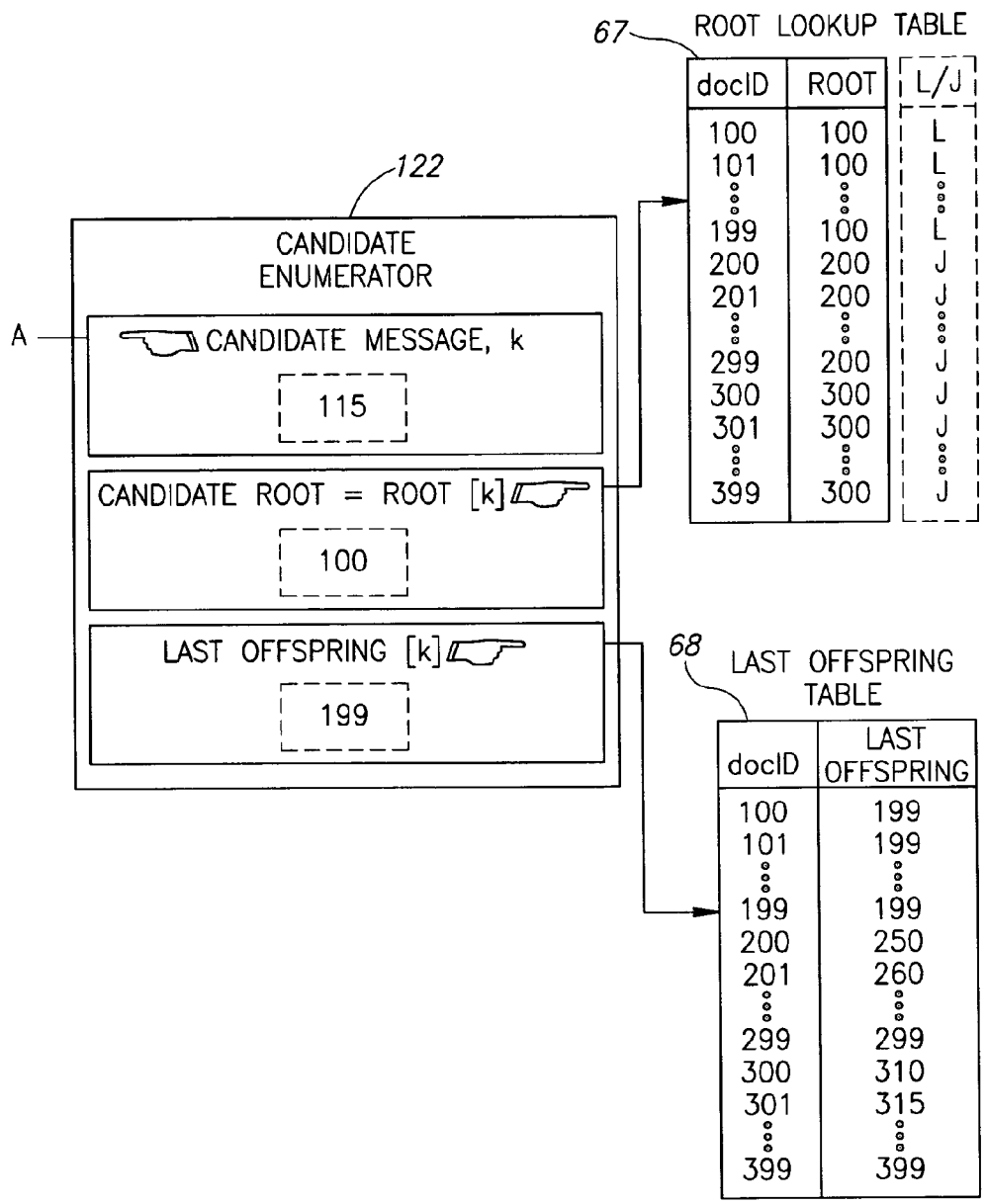
Figure 18A:
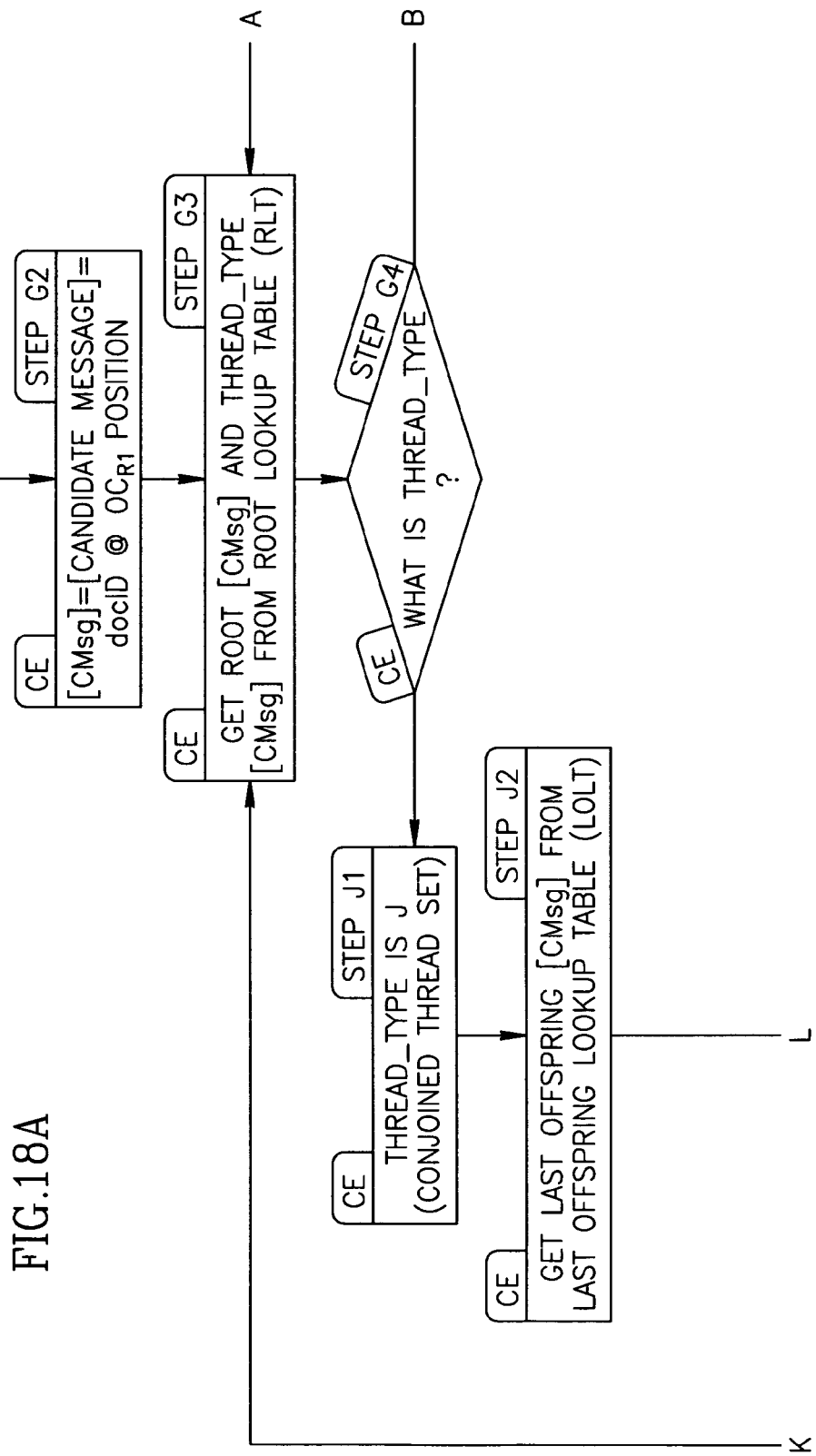
FIG. 18 is a flow chart illustration of the candidate enumeration and verification process of FIG. 16.
Figure 18B:
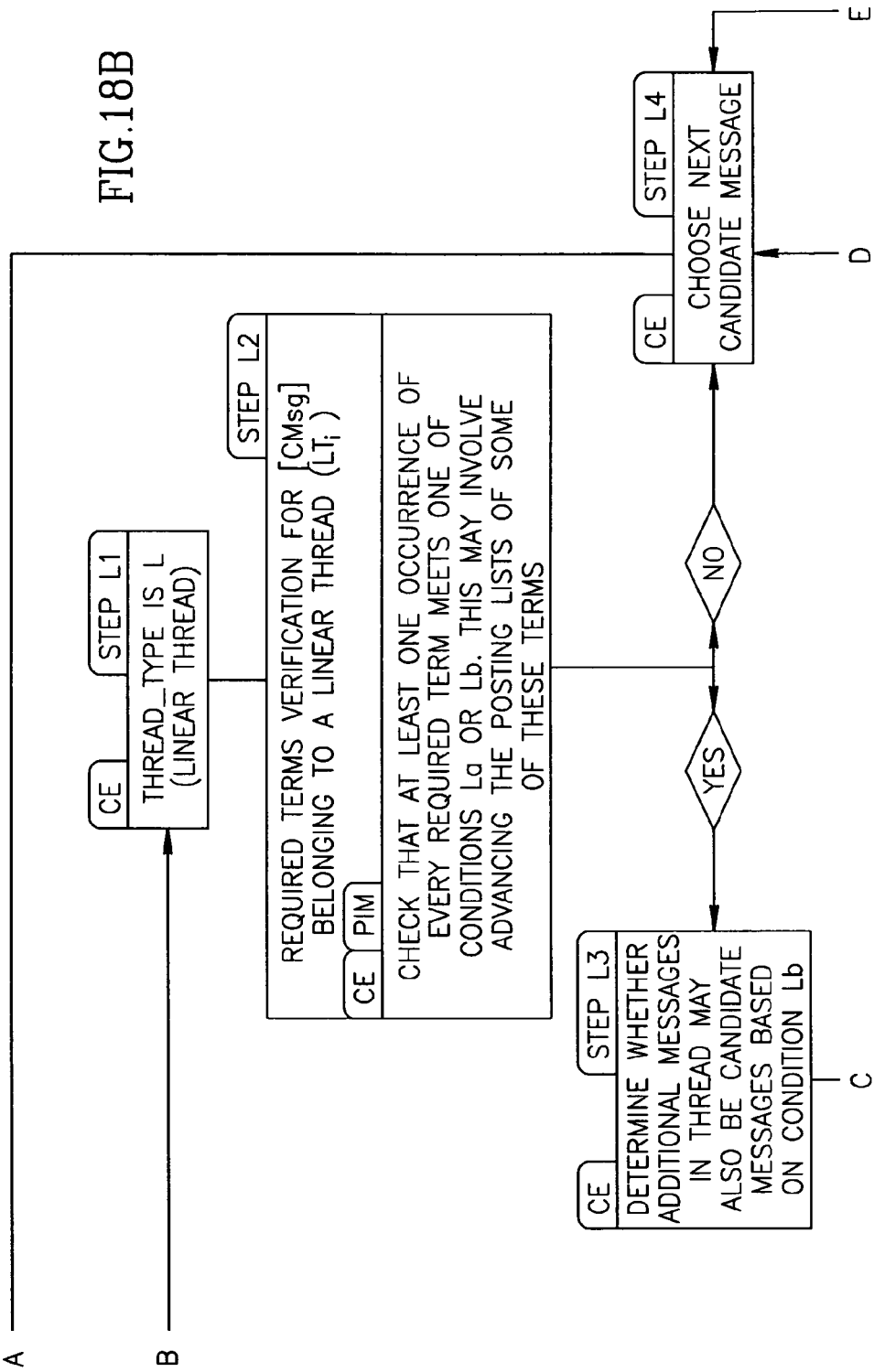
Figure 18C:
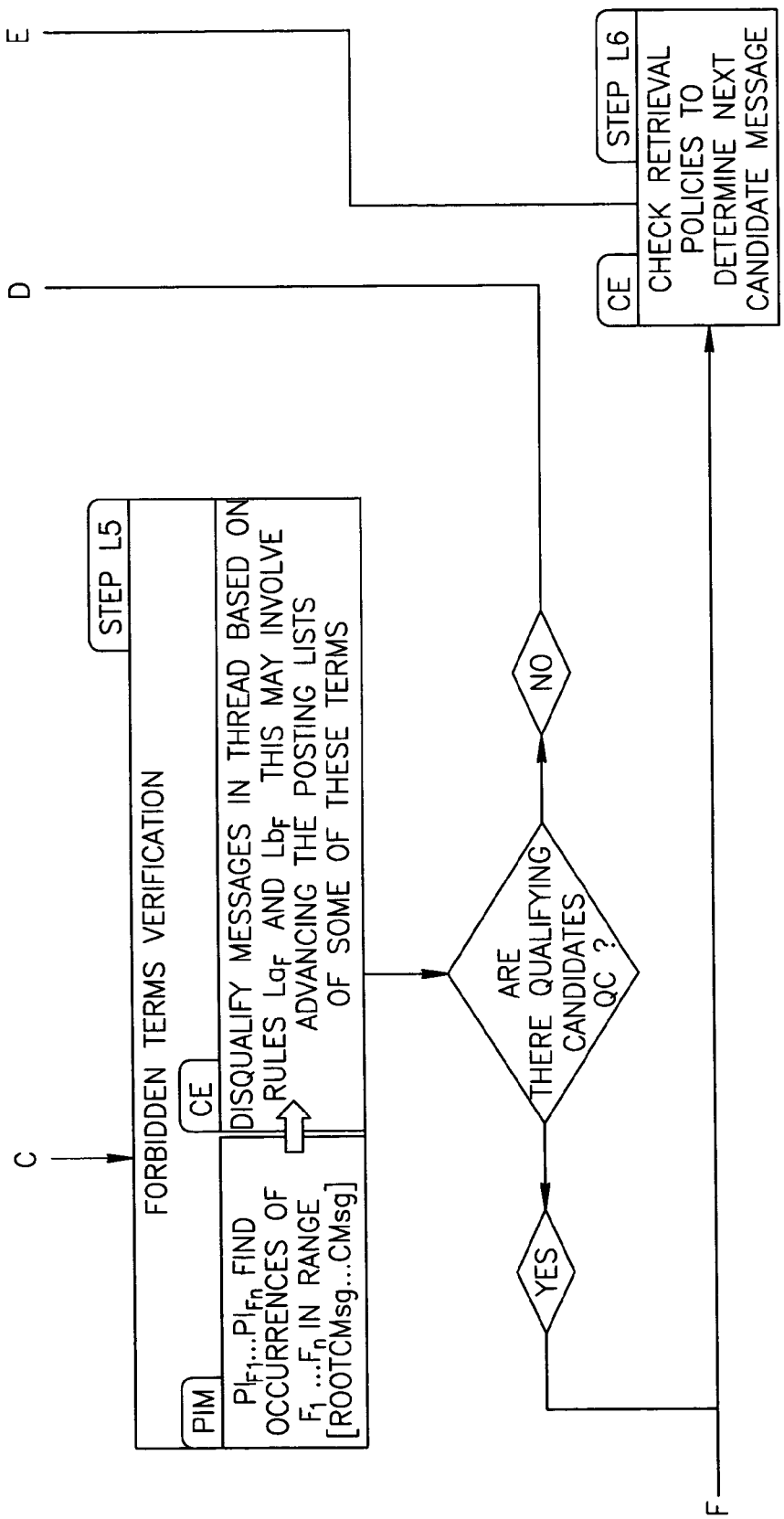
Figure 18D:
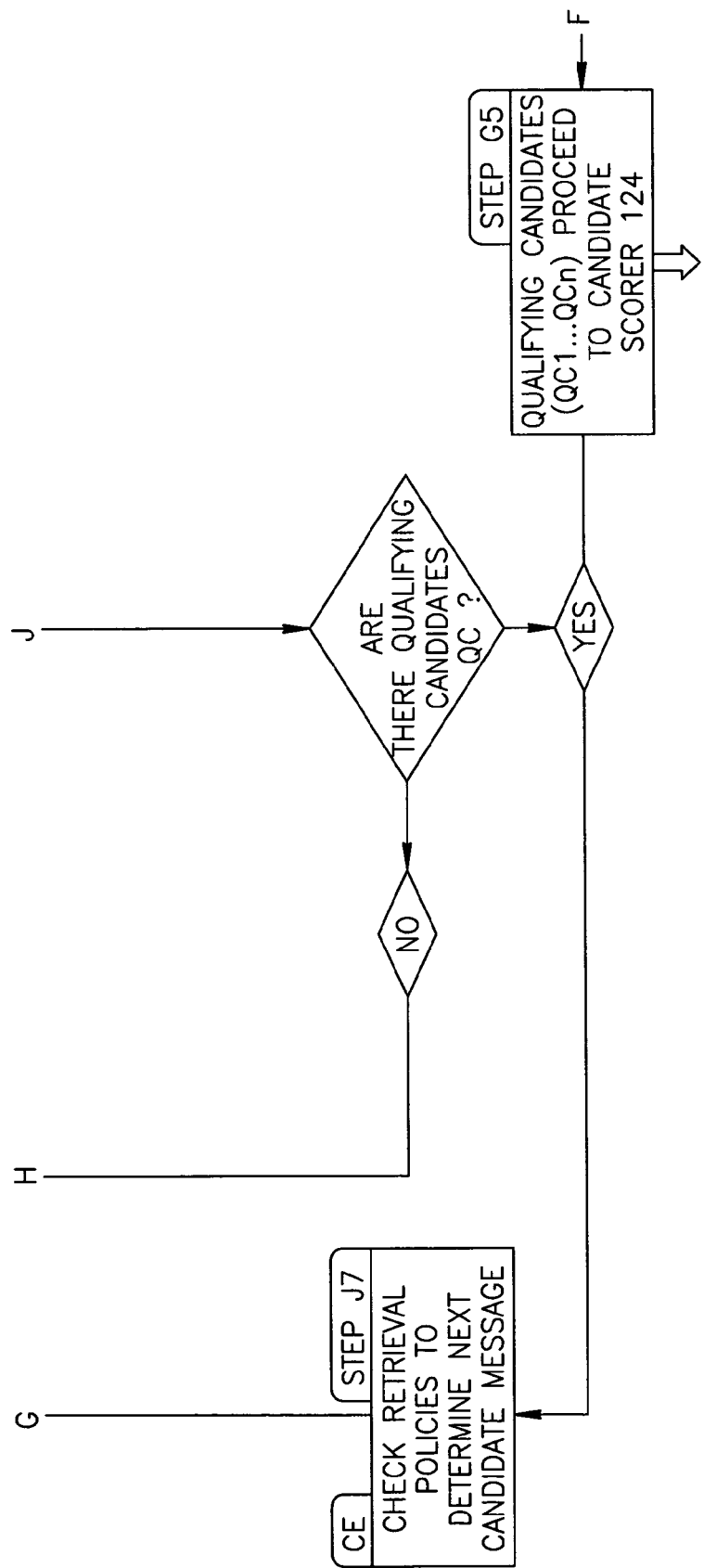
Figure 18E:
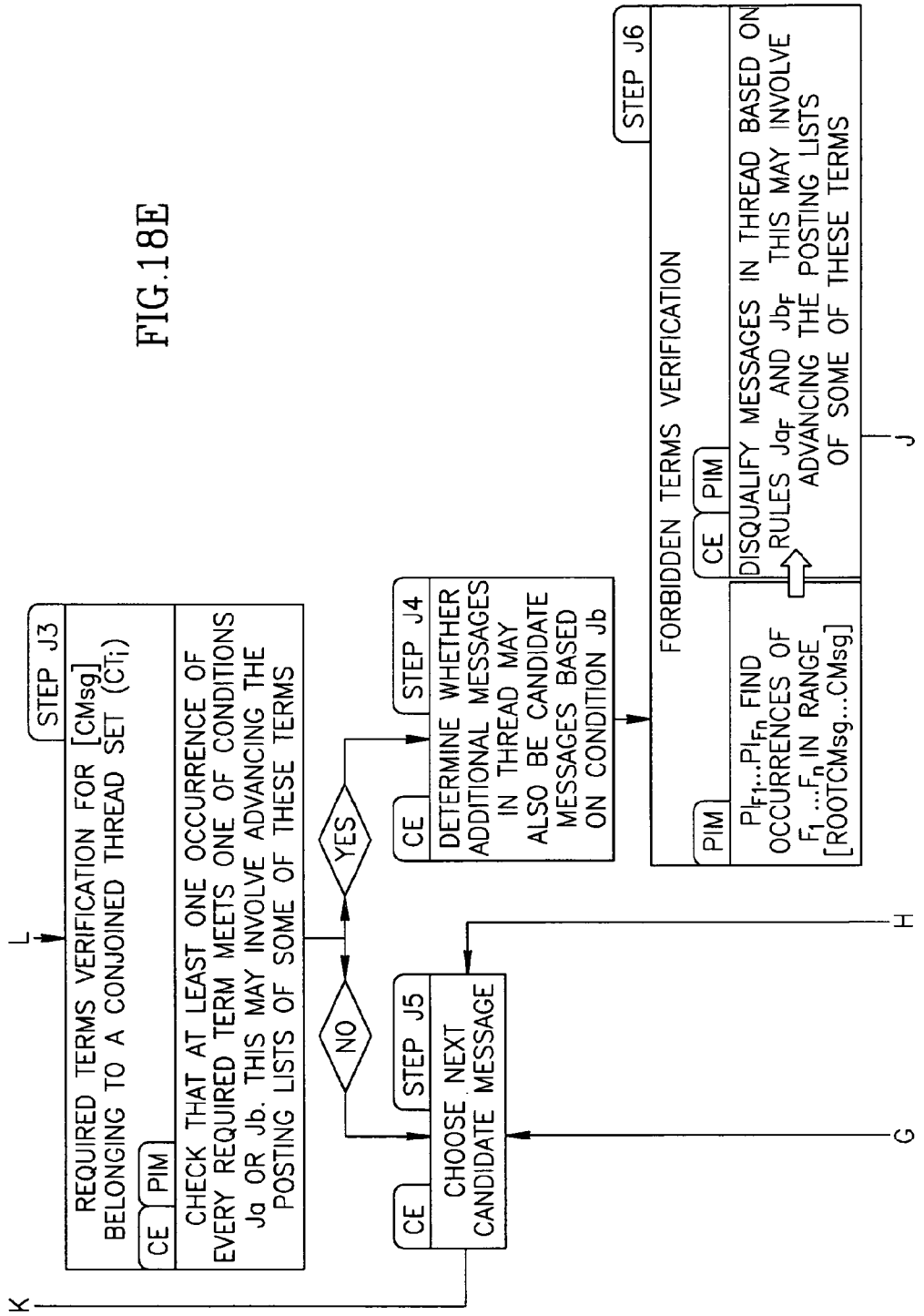

Reference is now made to FIGS. 17 and 18, which describe the iterative process of candidate enumeration and verification performed by CE 122 and PIM 120. FIG. 17 provides an example for the initial steps of the process. FIG. 18 is a flowchart which describes a complete cycle of the process from nomination through validation of a candidate message.

In the example shown in FIG. 17, query 52 may contain required terms R1, R2 and R3. Postings iterator $PI_{R1}$ may traverse the posting list for term $R_1$ ($PL_{R1}$), postings iterator $PI_{R2}$ may traverse the posting list for term $R_2$ ($PL_{R2}$) and postings iterator $PI_{R3}$ may traverse the posting list for term $R_3$ ($PL_{R3}$). In the first step of the process (step G1 in FIG. 18), posting iterator $PI_{R1}$ may select the first occurrence $OC_{R1}$ of required term $R_1$. In the example shown in FIG. 17, $OC_{R1}$ is located at posting entry (PE) 152. Upon the selection of occurrence $OC_{R1}$ by postings iterator $PI_{R1}$, candidate enumerator 122 may enumerate docID 115 for candidacy and pointer CandidateMessage may point to docID 115 (step G2 in FIG. 18).

Candidate enumerator 122 may then access root lookup table 67 to determine the root of the candidate message (step G3 in FIG. 18). In the example shown in FIG. 17, the root of the candidate message docID 115, is 100 according to root lookup table 67 as, in the example of FIG. 17, all docIDs numbered 100 to 199 in root lookup table 67 have root 100, all docIDs numbered 200 to 299 have root 200, etc. Pointer CandidateRoot may then point to the root of the candidate message, e.g. docID 100 in the example of FIG. 17.

In a preferred embodiment of the present invention, candidate enumerator 122 may consult root lookup table 67 to ascertain whether the candidate message is part of a linear or conjoined thread (step G4 in FIG. 18). In this embodiment, one process is provided for candidate messages belonging to linear threads (steps L1 through L6 in FIG. 18) and a different process is provided for candidate messages belonging to conjoined thread sets (steps J1 through J7 in FIG. 18) In another preferred embodiment of the present invention, all candidate messages may be processed as conjoined thread sets. The conjoined thread set procedure may be valid for both conjoined thread sets and linear threads since a linear thread is a simple, special instance of a conjoined thread set.

As shown in FIG. 18, candidate enumerator 122 may determine that a candidate message belongs to a linear thread (step L1), and begin the procedure for checking a candidate message which belongs to a linear thread (step L2). Candidate enumerator 122 may then check if either one of the following two conditions are true for an occurrence of each of the remaining required terms, $R_2 \ldots R_n$ on posting lists $PL_{R2} \ldots PL_{Rn}$ respectively, as located by $PI_{R2} \ldots PI_{Rn}$ respectively.

The two conditions may be:
  La) The occurrence of the required term is a meta occurrence in docID [CandidateMessage]; and
  Lb) The occurrence of the required term is a content occurrence in a docID in the range of {CandidateRoot . . . CandidateMessage}.

These conditions imply that when the postings iterator of a posting list of a required term $PI_{Ri}$ is on a message with docID X, all other posting lists may be safely advanced to a position at or beyond Root [X] without any loss of recall.

Returning to the example shown in FIG. 17, CE 122 and PIM 120 may check CandidateMessage 115 and CandidateRoot 100 against conditions La and Lb. To this end, CE 122 may examine the occurrence of required term $R_2$ at posting entry 154 on $PL_{R2}$. Posting entry 154 indicates a content occurrence of required term $R_2$ in docID 100. Candidate enumerator 122 may ascertain that occurrence 154 meets condition Lb above since the occurrence of term $R_2$ at docID 100 is a content occurrence of the required term in the range of {Root [X] . . . X}, that is, in the range {100 . . . 115}.

Candidate enumerator 122 may then consider occurrence 156, of required term $R_3$ in docID 105, as located by postings iterator $PI_{R3}$. However, since occurrence 156 is a meta-occurrence, it must fulfill condition La, and since the candidate message under consideration is docID 115 and not docID 105, condition La is not satisfied. Condition Lb is also not satisfied by occurrence 156 because condition Lb requires a content occurrence and not a meta occurrence. Postings iterator $PI_{R3}$ may then advance to occurrence 158 of term $R_3$ on $PL_{R3}$. This occurrence is found to satisfy condition Lb because it is a content occurrence at docID 105 falling in the required range of 100 to 115.

Returning now to FIG. 18, candidate enumerator 122 may proceed to step L3 if it determines that every required term of query 52 meets one of conditions La or Lb. Candidate enumerator 122 may proceed to step L4 and choose a new candidate message if at least one required term of query 52 does not meet condition La or Lb.

During step L3, CE 122 may determine if the candidate message under consideration is limited to CandidateMessage, or if all docIDs in the range {CandidateMessage . . . LastOffspring[CMsg]} may also be candidates. The last offspring of the candidate message, LastOffspring[CMsg] may be determined by CE 122 either by accessing last offspring lookup table 68, or by finding the highest docID in root lookup table 67 which has the same root as CandidateMessage. Referring briefly to FIG. 17, it may be seen in last offspring lookup table 68 that the last offspring of CandidateMessage 115 is docID 199, and that the highest docID in root lookup table 67 sharing root 100 with CandidateMessage 115 is docID 199.

Returning now to FIG. 18, CE 122 may consider all docIDs in the range {CandidateMessage . . . LastOffspring[CMsg]} if condition Lb in step L2 applies to all required terms posting lists (i.e., a match with no meta-occurrences has been identified). In this case, it may be guaranteed that all messages in the thread whose docID is greater than CandidateMessage may also be qualifying messages, due to the structural nature of well-ordered threaded EMTs, dictating that an EMT X in a thread, by definition, contains all of the content of the EMTs preceding it in the thread.

CE 122 may then proceed to verify (step L5) the absence of forbidden terms in CandidateMessage or in the range {CandidateMessage . . . LastOffspring[CMsg]}. CE 122 may examine the occurrences of all forbidden terms $F_1 \ldots F_n$ which fall within the range [CandidateRoot, . . . CandidateMessage] to determine if CandidateMessage or ranges of messages in the thread to which CandidateMessage belongs may be disqualified for containing forbidden terms. Candidate enumerator 122 may disqualify candidate messages according to the following rules:

La$_F$) A 'content' type occurrence of any forbidden term $F_1 \ldots F_n$ anywhere in range [CandidateRoot, . . . CandidateMessage] may disqualify all the messages in the thread whose docID is greater than or equal to CandidateMessage; and Lb$_F$) A 'meta' type occurrence within CandidateMessage may disqualify only CandidateMessage.

Candidate enumerator 122 may proceed to step L4 and choose a new candidate message if all candidate messages are disqualified in step L5 for containing forbidden terms. Qualifying candidate messages not disqualified for containing forbidden terms may proceed to candidate scorer 124 (step G5).

Candidate scorer 124 may assign scores to qualifying candidates on the basis of all the occurrences of query terms $R_1 \ldots R_n$ and $O_1 \ldots O_n$ in the message by iterating through query term occurrences in the range [CandidateRoot, . . . CandidateMessage] of all term posting lists. All content occurrences in the range may contribute to the score of a qualifying candidate QC, but meta occurrences may only contribute to the score of a qualifying candidate if they occur in the qualifying candidate itself.

Once candidate enumerator 122 verifies a qualifying candidate or candidates, CE 122 may proceed to step L6. In step L6, candidate enumerator 122 may choose the next candidate message in consideration of the retrieval policy of search engine 40. For example, the retrieval policy of search engine 40 may dictate that it is sufficient to return as search results, only the first message in each thread which satisfies query 52. In this case, after scoring one qualifying candidate, candidate enumerator may start searching for the next candidate beginning from the next thread, i.e., candidate enumerator 122 may skip all messages in the thread of the current qualifying candidate.

Alternatively, if the retrieval policy of search engine 40 dictates that all relevant messages in the thread should be returned as search results, the search may be continued from CandidateMessage+1. This method may allow search engine 40 to easily identify the highest scoring message of the thread—all thread candidates may be enumerated sequentially, since they may be indexed with consecutive docIDs. Furthermore, scores for successive docIDs in a thread may be computed simply by candidate scorer 124 on the basis of the scores of preceding docIDs, that is, according to a methodology based on the patterns of the email thread, in the following way: It is assumed that the score S(k) of message k was just computed by candidate scorer 124, and that the next CandidateMessage may be k+j. Since the content of each message may be fully contained in the text of the following messages, the score S(k+j) of message (k+j) may equal to:

$$S(k+j)=S(k)+CS(k+1,\ldots,k+j)-MS(k)+MS(k+j)$$

where CS indicates the score contributed by content occurrences and MS indicates the score contributed by meta occurrences.

Returning now to step G4 in FIG. 18, candidate enumerator 122 may determine (step J1) that a candidate message belongs to a conjoined thread set, and then begin the examination procedure. Candidate enumerator 122 may first access last offspring lookup table 68 to determine (step J2) the last offspring of the candidate message. Then CE 122 may proceed to step J3 and begin the verification process of the candidate message, in which CE 122 may determine if either one of the following two conditions are true for at least one occurrence of each of the remaining required terms, $R_2 \ldots R_n$ on posting lists $PL_{R2} \ldots PL_{Rn}$ respectively, as located by $PI_{R2} \ldots PI_{Rn}$ respectively.

The two conditions may be:
Ja) The occurrence of the required term is a meta-occurrence in docID [CandidateMessage].
Jb) The occurrence of the required term is a content occurrence in docID X where X≦CandidateMessage and LastOffspring [X]≧CandidateMessage.

These conditions imply that when the postings iterator $PI_{Ri}$ of a posting list $PL_{Ri}$ of a required term Ri is on a message with docID k, all other posting lists may be safely advanced to a position satisfying the following two conditions without any loss of recall:

I. at or beyond Root [k] but no later than k; and
II. the LastOffspring of the position to which the posting list is advanced is not smaller than k.

When condition (I) holds, but condition (II) does not, (i.e., a query term is in a position X greater than Root[k] but LastOffspring[X]<k), the posting list of the term may be safely advanced to a position beyond LastOffspring [X].

CE 122 may then proceed to step J4 if it determines that every required term of query 52 meets one of conditions Ja or Jb. CE 122 may proceed to step J5 and choose a new candidate message if at least one required term of query 52 does not meet condition Ja or Jb.

During step J4, CE 122 may determine if the candidate message under consideration is limited to CandidateMessage, or if all docIDs in the range {CandidateMessage . . . LastOffspring [CMsg]} may also be candidates. CE 122 may consider all docIDs in this range if condition Jb in step J4 applies to all posting lists (i.e., a match with no meta-occurrences has been identified). In this case it may be guaranteed that all messages in the thread whose docID is no larger than LastOffspring [CandidateMessage] may also be candidates.

CE 122 may also use the following rule to improve searching efficiency: If an occurrence of a query term in docID X satisfies CandidateRoot<X<CandidateMessage but LastOffspring[X]<CandidateMessage, the posting list of the term may be advanced to the docID numbered LastOffspring[X]+1.

Candidate enumerator 122 may then proceed (step J6) to verify the absence of forbidden terms in CandidateMessage or in the range {CandidateMessage . . . LastOffspring[CMsg] }. CE 122 may examine the occurrences of all forbidden terms $F_1 \ldots F_n$ that fall within the range [CandidateRoot, . . . CandidateMessage] to determine if CandidateMessage or ranges of messages in the thread to which CandidateMessage belongs may be disqualified for containing forbidden terms. Candidate enumerator 122 may disqualify messages according to the following rules:

$Ja_F$) A 'content' type occurrence of any forbidden term $F_1 \ldots F_n$ at location X satisfying X≦CandidateMessage and LastOffspring [X]≧CandidateMessage, may disqualify X and all its offspring, i.e. all messages whose docID is between X and LastOffspring [X] (inclusive).
$Jb_F$) A 'meta' type occurrence within CandidateMessage may disqualify only CandidateMessage.

CE enumerator 122 may proceed to step J5 and choose a new candidate message if all candidate messages are disqualified in step J6 for containing forbidden terms. Qualifying candidate messages not disqualified for containing forbidden terms may proceed to candidate scorer 124 (step G5).

Candidate score assessor 124 may assign scores to qualifying candidates on the basis of all the occurrences of query terms $R_1 \ldots R_n$ and $O_1 \ldots O_n$ the message by iterating through query term occurrences in the range [CandidateRoot, . . . CandidateMessage], of all term posting lists. All content occurrences in docIDs whose LastOffspring≧CandidateMessage may contribute to the score of the qualifying candidate, but meta occurrences may only contribute to the score of the qualifying candidate if they occur in the qualifying candidate itself.

Once candidate enumerator 122 verifies a qualifying candidate or candidates, CE 122 may proceed to step J7. In step J7, candidate enumerator 122 may choose the next candidate message in consideration of the retrieval policy of search engine 40. For example, the retrieval policy of search engine 40 may dictate that it is sufficient to return as search results, only the first message in each thread which satisfies query 52. In this case, after scoring one qualifying candidate, candidate enumerator may start searching for the next candidate beginning from the next thread, i.e., candidate enumerator 122 may skip all messages in the thread of the current qualifying candidate, and begin searching at the docID numbered LastOffspring[CandidateRoot]+1.

Alternatively, if the retrieval policy of search engine 40 dictates that all relevant messages in the thread should be returned as search results, the search may be continued from CandidateMessage+1. This method may allow search engine 40 to easily identify the highest scoring message of the thread set—all thread candidates may be enumerated sequentially, since they may be indexed with consecutive docIDs.

For scoring, operations may depend on whether CandidateMessage+1 refers to CandidateMessage, (i.e., CandidateMessage is an ancestor of CandidateMessage+1). If CandidateMessage+1 refers to CandidateMessage, scores for successive docIDs may be computed simply by candidate scorer 124 as described previously for linear threads.

However, if the last scored CandidateMessage has no offspring, the CandidateMessage counter may be advanced by one, and all posting lists may be set to the root of the new CandidateMessage, in which case some posting lists may be rewound.

Alternatively, search engine 40 may follow a hybrid approach and may return one message per qualifying thread in the thread set. This may be achieved by advancing the next candidate to LastOffspring[CandidateMessage]+1.

Figure 19:
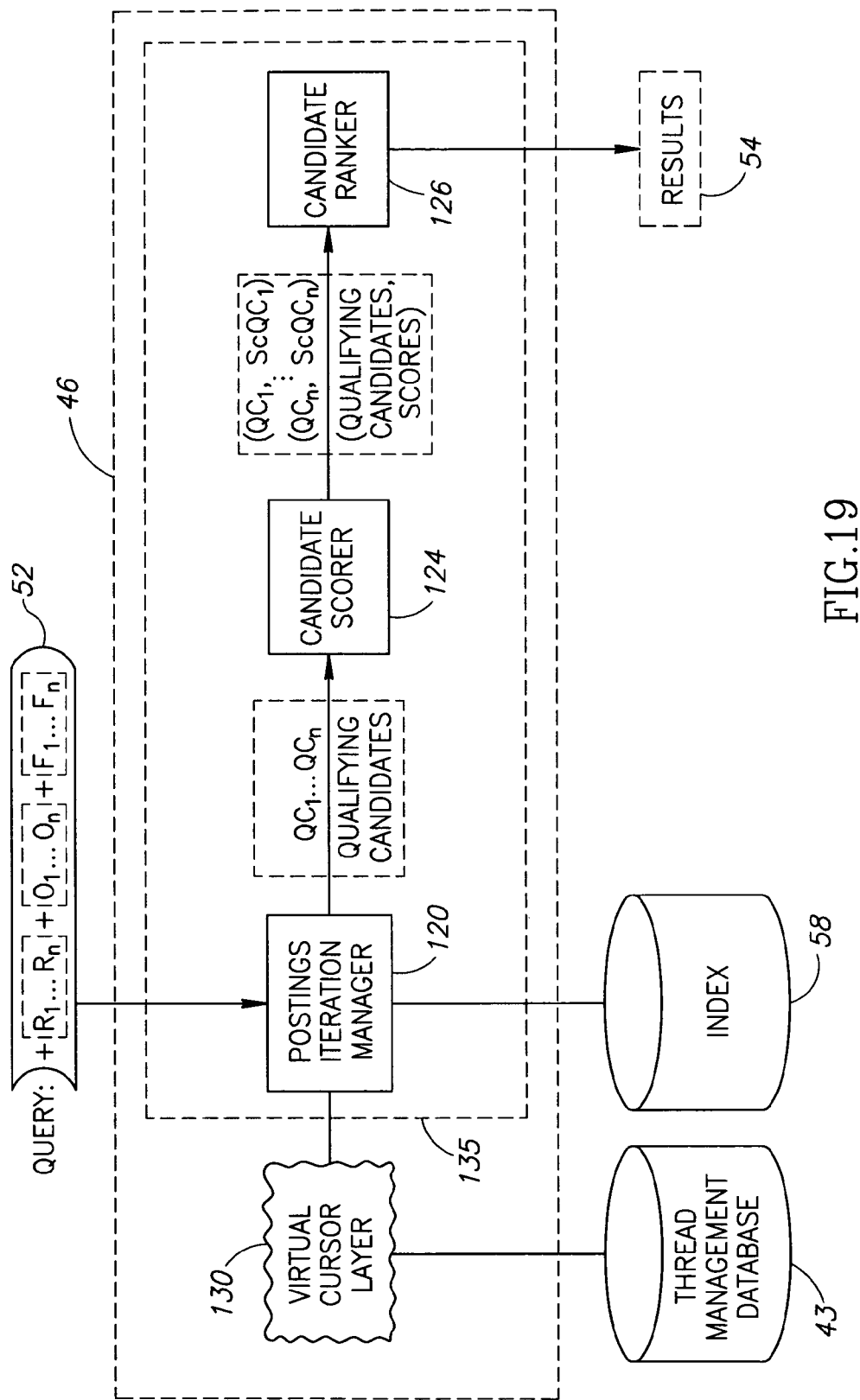
FIG. 19 is a block diagram illustration of the details of an alternative embodiment of the query manager of FIG. 5.

In an additional preferred embodiment of the present invention, illustrated in FIG. 19, reference to which is now made, the thread-based candidate enumeration process performed jointly by candidate enumerator 122 and postings iteration manager 120 in an iterative process as described hereinabove, may be separated from the other query manager processes and may be performed by virtual cursor layer 130 as shown in FIG. 19. This embodiment may allow thread-aware searches to be conducted within query processors which have not been especially adapted to this particular type of search method, such as query processor 135 shown in FIG. 19.

Objects and processes illustrated in FIG. 19 which are analogous to objects and processes illustrated in FIG. 16 are identified with corresponding reference numerals. In both embodiments of the present invention, as shown in FIGS. 16 and 19, query 52 may comprise the input for query manager 46. In both embodiments, postings iteration manager 120 may employ posting iterators, also known in the art as physical index cursors, for each query term as shown in FIG. 17. However, while postings iteration manager 120 and candidate enumerator 122 may work in tandem, as shown in FIG. 16 and as described hereinabove, to perform the process of candidate enumeration, FIG. 19 shows how virtual cursor layer 130, in accordance with an additional preferred embodiment of the present invention, may serve as an intermediary between postings iteration manager 120 and thread management database 43, directing selection of candidate EMTs by the posting iterators within postings iteration manager 120. Postings iteration manager may thus be contained within a query processor 135, as shown in FIG. 19, which may be separate from virtual cursor layer 130, and which may not be specially adapted to conduct thread-aware query processing.

Virtual cursor layer 130 may operate as if it were superimposed over the posting iterators within postings iteration manager 120. Virtual cursor layer 130 may thus provide knowledge of the thread structure of the EMT volume being queried, as described by the data stored in thread management database 43, which may include root lookup table 67 and last offspring table 68 (FIG. 16), to the underlying posting iterators. The candidate enumeration process conducted by the posting iterators may thus, as in the embodiment of the present invention illustrated in FIG. 16, be steered according to the peculiarities of the EMT volume thread structure.

The employment of virtual cursor layer 130 may isolate the query process from the EMT volume thread structure model, and may thus allow the EMT volume thread structure model to be used in a query process while the query process may remain oblivious to the details of the thread structure and its implementation in candidate enumeration. This embodiment of the present invention may thereby allow thread-aware searches to be conducted within query processes which have not been specially adapted to this particular type of search method.

Virtual cursor layer 130 may be provided by creating a "positive" virtual cursor for each required term, and a "negative" virtual cursor for each forbidden term in query 52. Algorithms may be provided for the positive and negative versions of two basic cursor methods next ( ) and fwdBeyond ( ) as well as for the method fwdShare( ). These algorithms, PositiveVirtual::next ( ), PositiveVirtual::fwdBeyond ( ), NegativeVirtual::next ( ) NegativeVirtual::fwdBeyond ( ) and Physical::fwdShare ( ) may dictate the movements of the virtual cursors and the underlying posting iterators, thereby enumerating candidate EMTs. Pseudocode for the algorithms is shown in FIG. 20, reference to which is now made.

Algorithms 140, 142, 144, 146 and 148 shown in FIG. 20 describe a candidate enumeration procedure which is similar in principle to the procedure explained hereinabove with respect to FIGS. 16 and 17. Both candidate enumeration procedures utilize the EMT thread structure description data to dictate the movement of the posting iterators so that the query process may be conducted in a more efficient manner than would be possible without the data, as explained hereinabove with respect to FIGS. 16 and 17.

In the algorithms shown in FIG. 20, THIS.DOCID corresponds to the current position of the virtual cursor, and the term $C_P$ corresponds to the underlying physical cursor. Algorithm 140, for positive next ( ) forwards the virtual cursor for term Ti to the next docID that contains term Ti. When $C_P$ is on a shared posting, all of the offspring of $C_P$, which inherit term Ti from $C_P$, are enumerated, as shown in lines 2-4 of the pseudocode, before $C_P$ is physically moved, in line 7 of the pseudocode.

Algorithm 142, for positive fwdBeyond(d), as shown in FIG. 20, forwards the virtual cursor to the next docID at or beyond docID D which contains term Ti. This algorithm may rely on the physical cursor method fwdShare ( ) to do most of its work. The call to CP.fwdShare(d), in line 6 of algorithm 142, attempts to position CP on the next document that shares term Ti with docID D. If there is no such document, fwdShare ( ) returns with CP positioned on the first document beyond d.

Algorithm 144, for negative next ( ), as shown in FIG. 20 forwards the virtual cursor to the next document not containing term Ti. It works by striving to keep CP positioned ahead of the virtual cursor. The documents d ∈ {THIS.DOCID, . . . CP−1}, which do not contain the term, may be enumerated until the virtual cursor catches up to CP, as shown in line 4 of the algorithm. When that happens, the virtual cursor is forwarded past the offspring of CP, which inherit the term from CP, as shown in lines 5-9 of algorithm 144, after which CP is moved forward, as shown in line 10. These steps may be repeated until CP moves ahead of the virtual cursor again.

Algorithm 146, for negative fwdBeyond(d) forwards the virtual cursor to the next docID at or beyond docID D that does not contain the term Ti. As shown in line 6 of algorithm 146 fwdShare(d) is called to position CP on the next docID which shares term Ti with docID D. Then, as shown in line 14, next( ) is called to position the virtual cursor on the next document that does not contain term Ti.

Algorithm 148, for fwdShare(d) strives to forward the physical cursor so that it shares term Ti with docID D. If there is no such document, it returns with the cursor positioned on the first docID beyond D. This is accomplished, as shown in line 1 of algorithm 148, by looping until the physical cursor moves beyond D or to a posting that shares term Ti with docID D. The movement of the physical cursor depends on where the cursor lies. As shown in FIG. 20, lines 5-7 of algorithm 148 pertain to the scenario in which the cursor lies outside of the entire conjoined thread set to which docID D belongs. Lines 9-11 of algorithm 148 pertain to the scenario in which the cursor lies within the conjoined thread set to which docID D belongs but not within the linear thread to which docID D belongs. Lines 13-15 of algorithm 148 pertain to the scenario in which the cursor lies on a private posting, that is, a particular occurrence of Ti which is not shared by any other docID. For example, all meta-occurrences are private, as well as occurrences in a solitary EMT which is its own root and last offspring.

In the additional preferred embodiment of the present invention illustrated in FIG. 19, candidate scoring and ranking may proceed as described in FIG. 16.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   storing information describing configurations of EMT (electronic message transmission) discussion threads of EMTs, the EMT discussion threads comprising respective series of EMTs that are exchanged among at least two individuals and having a root EMT, zero or more reply EMTs, and a last offspring EMT, the EMT discussion threads further comprising threads wherein each of the EMTs contains a full content of predecessor EMTs, wherein storing information comprises:
   enumerating said EMTs by assigning numerical identifiers to the EMTs according to creation times thereof;
   determining a thread type of said EMT discussion threads, respectively, the thread type being selected from a linear thread type, wherein each EMT contains a full text of each preceding EMT of its respective series of EMTs, and a conjoined thread type that comprises a set of EMT discussion threads that share a common root EMT;
   identifying the root EMT of the EMT discussion threads, respectively; and
   identifying the last offspring EMT of the EMT discussion threads, respectively;
   compacting said EMT discussion threads; and
   indexing compacted EMT discussion threads generated by said compacting to generate an index of well-ordered threads comprising a compact EMT volume of new content text of the EMTs and metadata of the predecessor EMTs in the respective well-ordered threads thereof and wherein the well-ordered threads of the compact EMT volume exclude repetitions of content text of the predecessor EMTs, and the index further comprises an inverted index for the compact EMT volume, wherein the metadata is a record of information regarding a sender, recipient, subject and chronology of the EMTs.

2. The method according to claim 1 and wherein enumerating comprises assigning consecutive numerical identifiers to successive EMTs within said EMT discussion threads, wherein for respective EMT discussion threads the root EMT thereof has a lowest numerical identifier, and the last offspring EMT thereof has a highest numerical identifier.

3. The method according to claim 1 and wherein each said EMT comprises meta-data and new content which said EMT adds to its discussion thread and wherein said compacting comprises per said EMT, identifying its said meta-data and said new content and wherein said indexing comprises indexing said meta-data and said new content for said EMTs.

4. The method according to claim 3, wherein said indexing comprises distinguishing between occurrences of a term in said meta-data and in a content of each said EMT.

* * * * *